US010469519B2

(12) United States Patent
Irimie et al.

(10) Patent No.: US 10,469,519 B2
(45) Date of Patent: *Nov. 5, 2019

(54) SYSTEMS AND METHODS FOR PERFORMING OF CREATING SIMULATED PHISHING ATTACKS AND PHISHING ATTACK CAMPAIGNS

(71) Applicant: KnowBe4, Inc., Clearwater, FL (US)

(72) Inventors: Alin Irimie, Clearwater, FL (US); Wendy Bartlett, Clearwater, FL (US); David Austin, Dunedin, FL (US)

(73) Assignee: KnowBe4, Inc, Clearwater, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/891,158

(22) Filed: Feb. 7, 2018

(65) Prior Publication Data

US 2018/0167409 A1    Jun. 14, 2018

Related U.S. Application Data

(63) Continuation of application No. 15/442,215, filed on Feb. 24, 2017, now Pat. No. 9,894,092.

(60) Provisional application No. 62/300,399, filed on Feb. 26, 2016.

(51) Int. Cl.
*H04L 29/06* (2006.01)

(52) U.S. Cl.
CPC ...... *H04L 63/1433* (2013.01); *H04L 63/1483* (2013.01); *H04L 63/20* (2013.01)

(58) Field of Classification Search
CPC .. H04L 63/1433; H04L 63/1483; H04L 63/20
See application file for complete search history.

(56) References Cited

U.S. PATENT DOCUMENTS

| 7,599,992 | B2 | 10/2009 | Nakajima |
| 8,041,769 | B2 | 10/2011 | Shraim et al. |
| 8,464,346 | B2 | 6/2013 | Barai et al. |
| 8,484,741 | B1 | 7/2013 | Chapman |

(Continued)

FOREIGN PATENT DOCUMENTS

WO    WO-2016/164844 A1    10/2016

OTHER PUBLICATIONS

Advisory Action for U.S. Appl. No. 15/442,218, dated Oct. 13, 2017.

(Continued)

*Primary Examiner* — Oleg Korsak
(74) *Attorney, Agent, or Firm* — Christopher J. McKenna; Foley & Lardner LLP

(57) ABSTRACT

A method for establishing a campaign for a simulated phishing attack includes receiving, via a campaign manager, specification of a plurality of parameters for a campaign including at least an identifier of a campaign and identification of users to which to send the campaign, establishing, via the campaign manager, a type of exploit for the campaign and one or more types of data to collect via the type of exploit, storing, by the campaign manager, the campaign comprising the plurality of parameters, and identifying, by a simulation server, the campaign stored in the database to create a simulated phishing email, to be sent to email accounts of the users, using the plurality of parameters of the campaign, wherein the simulated phishing email is to be created to have a link to a landing page comprising the type of exploit and configured to collect the one or more types of data.

20 Claims, 13 Drawing Sheets

(56) References Cited

U.S. PATENT DOCUMENTS

| | | |
|---|---|---|
| 8,615,807 B1 | 12/2013 | Higbee et al. |
| 8,635,703 B1 | 1/2014 | Belani et al. |
| 8,719,940 B1 | 5/2014 | Higbee et al. |
| 8,793,799 B2 | 7/2014 | Fritzson et al. |
| 8,910,287 B1 | 12/2014 | Belani et al. |
| 8,966,637 B2 | 2/2015 | Belani et al. |
| 9,053,326 B2 | 6/2015 | Higbee et al. |
| 9,246,936 B1 | 1/2016 | Belani et al. |
| 9,253,207 B2 | 2/2016 | Higbee et al. |
| 9,262,629 B2 | 2/2016 | Belani et al. |
| 9,325,730 B2 | 4/2016 | Higbee et al. |
| 9,356,948 B2 | 5/2016 | Higbee et al. |
| 9,373,267 B2 | 6/2016 | Sadeh-Koniecpol et al. |
| 9,398,029 B2 | 7/2016 | Sadeh-Koniecpol et al. |
| 9,398,038 B2 | 7/2016 | Higbee et al. |
| 9,591,017 B1 | 3/2017 | Higbee et al. |
| 9,635,052 B2 | 4/2017 | Hadnagy |
| 9,667,645 B1 | 5/2017 | Belani et al. |
| 9,674,221 B1 | 6/2017 | Higbee et al. |
| 9,729,573 B2 | 8/2017 | Gatti |
| 9,813,454 B2 | 11/2017 | Sadeh-Koniecpol et al. |
| 9,870,715 B2 | 1/2018 | Sadeh-Koniecpol et al. |
| 9,894,092 B2 | 2/2018 | Irimie et al. |
| 9,912,687 B1 | 3/2018 | Wescoe et al. |
| 9,942,249 B2 | 4/2018 | Gatti |
| 9,998,480 B1 | 6/2018 | Gates et al. |
| 2007/0142030 A1 | 6/2007 | Sinha et al. |
| 2010/0211641 A1 | 8/2010 | Yih et al. |
| 2010/0269175 A1 | 10/2010 | Stolfo et al. |
| 2012/0124671 A1 | 5/2012 | Fritzson et al. |
| 2012/0258437 A1 | 10/2012 | Sadeh-Koniecpol et al. |
| 2013/0198846 A1 | 8/2013 | Chapman |
| 2013/0203023 A1 | 8/2013 | Sadeh-Koniecpol et al. |
| 2013/0219495 A1 | 8/2013 | Kulaga et al. |
| 2013/0297375 A1 | 11/2013 | Chapman |
| 2014/0173726 A1 | 6/2014 | Varenhorst |
| 2014/0199663 A1 | 7/2014 | Sadeh-Koniecpol et al. |
| 2014/0199664 A1 | 7/2014 | Sadeh-Koniecpol et al. |
| 2014/0201835 A1 | 7/2014 | Emigh et al. |
| 2014/0230061 A1 | 8/2014 | Higbee et al. |
| 2014/0230065 A1 | 8/2014 | Belani et al. |
| 2015/0163242 A1 | 6/2015 | Laidlaw et al. |
| 2015/0180896 A1 | 6/2015 | Higbee et al. |
| 2015/0229664 A1 | 8/2015 | Hawthorn et al. |
| 2016/0036829 A1 | 2/2016 | Sadeh-Koniecpol et al. |
| 2016/0142439 A1 | 5/2016 | Goutal |
| 2016/0164898 A1 | 6/2016 | Belani et al. |
| 2016/0173510 A1 | 6/2016 | Harris et al. |
| 2016/0234245 A1 | 8/2016 | Chapman |
| 2016/0261618 A1 | 9/2016 | Koshelev |
| 2016/0301705 A1 | 10/2016 | Higbee et al. |
| 2016/0301716 A1 | 10/2016 | Sadeh-Koniecpol et al. |
| 2016/0308897 A1 | 10/2016 | Chapman |
| 2016/0330238 A1 | 11/2016 | Hadnagy |
| 2017/0026410 A1 | 1/2017 | Gatti |
| 2017/0078322 A1 | 3/2017 | Seiver et al. |
| 2017/0104778 A1 | 4/2017 | Shabtai et al. |
| 2017/0140663 A1 | 5/2017 | Sadeh-Koniecpol et al. |
| 2017/0237776 A1 | 8/2017 | Higbee et al. |
| 2017/0244746 A1 | 8/2017 | Hawthorn et al. |
| 2017/0251009 A1 | 8/2017 | Irimie et al. |
| 2017/0251010 A1 | 8/2017 | Irimie et al. |
| 2017/0318046 A1 | 11/2017 | Weidman |
| 2017/0331848 A1 | 11/2017 | Alsaleh et al. |
| 2018/0041537 A1 | 2/2018 | Bloxham et al. |
| 2018/0103052 A1 | 4/2018 | Choudhury et al. |

OTHER PUBLICATIONS

Dunlap, et al., "Creating Service and Process Monitors", Sep. 19, 2014, (6 pages)<https://docs.labtechsoftware.com/LabTech11/Default.htm#UsingLabTech/MonitoringAndAlerting/MonitorSets/ServiceProcessMonitors/CreatingServicesAndProcessesMonitors.htm>.

Final Office Action for U.S. Appl. No. 15/442,215 dated Jul. 14, 2017.

Final Office Action for U.S. Appl. No. 15/442,218, dated Jul. 14, 2017.

Nadel, "A Big Hole In My Understanding Of ColdFusion Scheduled Tasks," May 9, 2011, 3 pages <https://www.bennadel.com/blog/2189-a-big-hole-in-my-understanding-of-coldfusion-scheduled-tasks.htm>.

Non-Final Office Action for U.S. Appl. No. 15/442,215, dated Apr. 14, 2017.

Non-Final Office Action for U.S. Appl. No. 15/442,218, dated Apr. 14, 2017.

Non-Final Office Action for U.S. Appl. No. 15/442,218, dated Dec. 13, 2017.

Notice of Allowance for U.S. Appl. No. 15/442,215, dated Oct. 16, 2017.

SANS Phishing Admin Guide, May 4, 2015 (11 pages) <https://securingthehuman.sans.org/media/resources/Phishing-Admin-Guide.pdf>.

Sjouwerman, "New KnowBe4 Console V4.0 Released," KnowBe4:Security Awareness Training Blog, Feb. 13, 2015 (6 pages) <https://blog.knowbe4.com/new-knowbe4-console-v4.0-released>.

Abu-Nimeh et al., "A Comparison of Machine Learning Techniques for Phishing Detection," eCrime '07: Proceedings of the anti-phishing working groups 2nd annual eCrime researchers summit, 2007, pp. 60-69, ACM Digital Library.

Palka et al., "Dynamic phishing content using generative grammars," Software Testing, Verification and Validation Workshops (ICSTW), 2015 IEEE Eighth International Conference, Date of Conference: Apr. 13-17, 2015, IEEE Xplore, pp. 1-8.

Create New Phishing Campaign

Note: A campaign will start 10 minutes after is activated or created.

| | |
|---|---|
| Name | [One time from categories: IT] |
| Start Time | [2/23/2016] [12:59 PM] [(GMT-05:00) Eastern Time (US & Canada)] |
| Frequency | ● One Time ○ Weekly ○ Bi-Weekly ○ Monthly |
| Templates | [IT ▼] |
| User Groups | [All Users ▼] |
| Phish Domain | [-- Random -- ▼] |
| Duration | [72] hours |
| | ☑ Spread emails over the campaign duration |
| | ☑ Don't send emails during weekends |
| | ☐ Send an email report to account admin after each Phishing Security Test |
| Add Clickers To | [-- Select Group -- ▼] |
| Add Exploit | [-- None -- ▼] |

Templates dropdown:
- ✓ -- Random (same random email to all users) --
- -- Full Random (random email to each user) --
- Change of Password Req'd immediately (difficulty rating: 3)
- Scheduled Tests on Your Computer (difficulty rating: 2)
- Email Server Migration Failure (difficulty rating: 3)
- Email Account Updates (difficulty rating: 3)
- Internet Capacity Warning (difficulty rating: 3)
- Windows 10 Upgrade Error (difficulty rating: 4)

← Back to Campaign

[Create Campaign]

FIG. 4

Create New Phishing Campaign

Note: A campaign will start 10 minutes after is activated or created.

Add Exploit

-- None -- ⇵

Harvest the following from users' machines:

User Data
- ☐ Current & Recently Logged on Users
- ☐ Realtime User Screen Capture Network Information
- ☐ Network Details
- ☐ System Hostfile System Information
- ☐ System Details
- ☐ Currently Running Applications
- ☐ Currently Running Services LDAP
- ☐ Active Domain User Details
- ☐ Active Directory Computers
- ☐ Active Directory Service Principal Names
- ☐ Active Directory Comments Password Search

[Create Campaign]

← Back to Campaign

Add Exploit

-- None --
Java Applet ⇵

✓

Harvest the following from users' machines:

User Data
- ☐ Current & Recently Logged on Users
- ☑ Realtime User Screen Capture Network Information
- ☑ Network Details
- ☐ System Hostfile System Information
- ☑ System Details
- ☑ Currently Running Applications
- ☐ Currently Running Services LDAP
- ☐ Active Domain User Details
- ☑ Active Directory Computers
- ☐ Active Directory Service Principal Names
- ☐ Active Directory Comments Password Search

FIG. 5

SYSTEMS AND METHODS FOR PERFORMING OF CREATING SIMULATED PHISHING ATTACKS AND PHISHING ATTACK CAMPAIGNS

RELATED APPLICATIONS

This application is a continuation of, and claims priority to and the benefit of U.S. patent application Ser. No. 15/444,215, titled "SYSTEMS AND METHODS FOR PERFORMING OR CREATING SIMULATED PHISHING ATTACKS AND PHISHING ATTACK CAMPAIGNS," and filed on Feb. 24, 2017, which claims priority to and the benefit of U.S. Provisional Application No. 62/300,399, titled "SYSTEMS AND METHODS FOR PERFORMING OR CREATING SIMULATED PHISHING ATTACKS AND PHISHING ATTACK CAMPAIGNS," and filed on Feb. 26, 2016, which are incorporated herein by reference in its entirety for all purposes.

A portion of the disclosure of this patent document contains material which is subject to copyright protection. The copyright owner has no objection to the facsimile reproduction by anyone of the patent document or the patent disclosure, as it appears in the file or records of the Patent and Trademark Office, but otherwise reserves all copyright rights whatsoever.

FIELD OF THE DISCLOSURE

This disclosure generally relates to systems and methods for performing simulated phishing attacks.

BACKGROUND OF THE DISCLOSURE

It can be useful to perform simulated phishing attacks on an individual or a set of individuals for purposes of extracting information from a device used by the individuals. A phishing attack involves an attempt to acquire sensitive information such as usernames, passwords, credit card details, etc., often for malicious reasons, possibly by masquerading as a trustworthy entity. For example, an email may be sent to a target, the email having an attachment that performs malicious actions when executed or a link to a webpage that either performs malicious actions when accessed or prompts the user to execute a malicious program. Malicious actions may be malicious data collection or actions harmful to the normal functioning of a device on which the email was activated, or any other malicious actions capable of being performed by a program or a set of programs.

BRIEF SUMMARY OF THE DISCLOSURE

A simulated phishing attack may test the readiness of a security system or users of a system to handle phishing attacks such that malicious actions are prevented. A simulated phishing attack campaign may, for example, target a large number of users, such as employees of an organization. Such a campaign may be performed by a party friendly or neutral to the target of the attack. In one type of simulated phishing attack, an attempt is made to extract sensitive information using phishing methods, and any extracted information is used not for malicious purposes but as part of a process of detecting weaknesses in security. Performing a simulated phishing attack can help expose weaknesses in the security infrastructure meant to protect users and/or devices from phishing attacks or other computerized, cyber, or digital attacks. It may also expose a lack of vigilance and/or know-how in a user or set of users of a device in minimizing risk associated with such attacks. This can allow a security manager to pinpoint specific issues to be resolved and to bolster security as appropriate. A simulated phishing attack may be performed by e.g. a security manager, or by a third party on behalf of a security manager.

A method of performing simulated phishing attacks is as follows. An email is sent to a target's email address, the email containing a link to a webpage. The email can masquerade as an email from a party known to the target, or can simply be an email from a party unknown to the target. The email may be designed to appear interesting to the recipient, and may offer or promise e.g. access to an interesting tidbit of news, access to useful computer software, access to knowledge of how to perform a money making scheme, or any other thing that may be of interest. If the simulated phishing attack target clicks the link and accesses the webpage, the target has failed the test, and a record of failure, as well as user information associated with the target, is generated and stored in a database for future review and/or analysis.

The present disclosure provides for new tools for performing nuanced simulated phishing attacks. These tools allow simulated phishing attack campaigns go a step further and include a number of potential "failure" actions. This can allow a more nuanced view of just how unready or lax a target is in responding to phishing attacks.

In simulated phishing attack campaigns, it may be useful to allow a campaign manager configurability and control over the how the campaign will be carried out. The present disclosure also provides tools for performing tailored nuanced simulated phishing attack campaigns.

The present disclosure provides for configurability, control and automation of running simulated phishing attacks. The present disclosure allows an administrator to design, edit and configure a simulated phishing attack, such as different types to target different users. The present disclosure provides for multiple different phishing attack campaigns of different types to be run and targeted against different or the same users using different attacks, exploits, and collecting different information. The present disclosure provides for granular configurability and control on the type, content, targets, data collection and execution parameters of campaigns. The present disclosure provides for configurability and control to an administration managing these campaigns and the execution thereof.

In an implementation, a user interface of a campaign management server may allow a campaign manager to control details of a simulated phishing campaign. The campaign manager may determine to use a particular exploit as part of the campaign, such as a Java application. The campaign manager may further select the data to be collected by the Java application, subject to the limitations of the chosen application. A campaign management server may, upon receiving this input from the campaign manager, begin a simulated phishing campaign of multiple simulated phishing attacks. The phishing attacks may be performed by sending one or more campaign messages to a campaign target. The campaign target may click a phishing link embedded in the campaign messages. Clicking such a click may cause a browser or application executed by a client device used by the campaign target to access an exploit webpage. An exploit webpage may notify, directly or indirectly, the campaign manager server that the link has been clicked. The exploit website may prompt the campaign target to execute a data collection application ("DCA")

downloader. The campaign target may accept and execute the DCA downloader. The DCA downloader may request, from a server, a location from which to download DCA install files. The location may be provided by a server, and the DCA downloader may, directly or indirectly, retrieve DCA install files. The DCA install files may be executed to install a DCA. The DCA may collect data from the campaign target and transmit that data to an exploit server, which may process and forward that data to the campaign management server.

In some implementations, a method for establishing a campaign for a simulated phishing attack based on at least a type of exploit includes receiving, via a campaign manager executing on a processor coupled to memory, specification of a plurality of parameters for a campaign of a simulated phishing attack, the plurality of parameters including at least an identifier of a campaign and identification of users to which to send the campaign. The method further includes establishing, via the campaign manager as parameters of the plurality of parameters, a type of exploit for the campaign and one or more types of data to collect via the type of exploit. The method further includes storing, by the campaign manager to a database, the campaign including the plurality of parameters, and identifying, by a simulation server, the campaign stored in the database to create a simulated phishing email, to be sent to email accounts of the users, using the plurality of parameters of the campaign, wherein the simulated phishing email is to be created to have a link to a landing page including the type of exploit and configured to collect the one or more types of data.

In some implementations, receiving specification of a plurality of parameters further includes receiving, via the campaign manager, specification of a plurality of parameters that identify one of a start time, a duration and a frequency of the campaign.

In some implementations, receiving specification of a plurality of parameters further includes receiving, via the campaign manager for the plurality of parameters, a selection of a simulated phishing email template to be used for creating the simulated phishing email.

In some implementations, receiving specification of a plurality of parameters further includes receiving, via the campaign manager for the plurality of parameters, a selection of a group of users for the identification of users.

In some implementations, establishing a type of exploit further includes receiving, via the campaign manager, a selection of the type of exploit from a plurality of different types of exploits.

In some implementations, establishing a type of exploit further includes receiving, via the campaign manager, a selection of the types of data to collect from one or more of the following types of data: user information, network information, system information and Light Directory Access Protocol (LDAP).

In some implementations, the method further includes receiving, via the campaign manager for the plurality of parameters, identification of a user group to which to add those users that interact with the simulated phishing email to cause traversal via the link to the landing page.

In some implementations, a system for establishing a campaign for a simulated phishing attack based on at least a type of exploit includes a campaign manager executable on a processor coupled to memory. The campaign manager is configured to receive a specification of a plurality of parameters for a campaign of a simulated phishing attack, the plurality of parameters including at least an identifier of a campaign and identification of users to which to send the campaign. The campaign manager is further configured to establish, as parameters of the plurality of parameters, a type of exploit for the campaign and one or more types of data to collect via the type of exploit, and to store to a database the campaign including the plurality of parameters. The system further includes a simulation server configured to identify the campaign stored in the database to create a simulated phishing email, to be sent to email accounts of the users, using the plurality of parameters of the campaign, wherein the simulated phishing email is to be created to have a link to a landing page including the type of exploit and configured to collect the one or more types of data.

In some implementations, the campaign manager is further configured to receive the specification of the plurality of parameters identifying one of a start time, a duration and a frequency of the campaign.

In some implementations, the campaign manager is further configured to receive for the plurality of parameters, a selection of a simulated phishing email template to be used for creating the simulated phishing email.

In some implementations, the campaign manager is further configured to receive a selection of a group of users for the identification of users.

In some implementations, the campaign manager is further configured to receive a selection of the type of exploit from a plurality of different types of exploits.

In some implementations, the campaign manager is further configured to receive a selection of the types of data to collect from one or more of the following types of data: user information, network information, system information and Light Directory Access Protocol (LDAP).

In some implementations, the campaign manager is further configured to receive the identification of a user group to which to add those users that interact with the simulated phishing email to cause traversal via the link to the landing page.

In some implementations, a method for running a campaign for a simulated phishing attack based on at least a type of exploit includes establishing, by a campaign manager executing on a processor coupled to memory, a campaign for a simulated phishing attack, the campaign including a plurality of parameters including at least an identifier of a campaign, an identification of users to which to send the campaign, a type of exploit and one or more types of data to collect via the type of exploit. The method further includes creating, by a simulation server based on the campaign, a simulated phishing email using the plurality of parameters of the campaign, wherein the simulated phishing email is created with a link to a landing page including the type of exploit and configured to collect the one or more types of data, and communicating, by the simulation server, the simulated phishing email to email accounts of the identified users. The method further includes receiving, by the simulation server responsive to the user interacting with the simulated phishing email to cause traversal via the link to the landing page, identification of the type of exploit and the one or more types of data collected via the landing page or via a data collection application associated with the landing page.

In some implementations, the method further includes establishing, by the campaign manager for the plurality of parameters, one of a start time, a duration and a frequency of the campaign.

In some implementations, communicating the simulated phishing email further includes communicating, by the simulation server, the simulating phishing email in accordance with one of a start time, a duration and a frequency of the campaign.

In some implementations, the method further includes establishing, by the campaign manager for the plurality of parameters, a selected group of users for the identification of users.

In some implementations, communicating the simulated phishing email further includes communicating, by the simulation server, the simulating phishing email to the selected group of users.

In some implementations, the types of data to collect include one or more of the following types of data: user information, network information, system information and Light Directory Access Protocol (LDAP).

In some implementations, the method further includes establishing, by the campaign manager for the plurality of parameters, identification of a user group which to add those users that interact with the simulated phishing email to cause traversal via the link to the landing page.

In some implementations, the method further includes adding, by the simulation server, to the identified user group one or more users that interact with the simulated phishing email to cause traversal via the link to the landing page.

In some implementations, a system for running a campaign for a simulated phishing attack based on at least a type of exploit includes a campaign manager executable on a processor coupled to memory. The campaign manager is configured to establish a campaign for a simulated phishing attack, wherein the campaign includes a plurality of parameters including at least an identifier of a campaign, identification of users to which to send the campaign, a type of exploit and one or more types of data to collect via the type of exploit. The system further includes a simulation server configured to create, responsive to the campaign, a simulated phishing email using the plurality of parameters of the campaign, wherein the simulated phishing email is created with a link to a landing page including the type of exploit and configured to collect the one or more types of data. The simulation server is further configured to communicate the simulated phishing email to email accounts of the identified users, and to receive, responsive to the user interacting with the simulated phishing email to cause traversal via the link to the landing page, identification of the type of exploit and the one or more types of data collected via the landing page.

In some implementations, the campaign manager is further configured to establish for the plurality of parameters, one of a start time, a duration and a frequency of the campaign.

In some implementations, the simulation server is further configured to communicate the simulating phishing email in accordance with one of a start time, a duration and a frequency of the campaign.

In some implementations, the campaign manager is further configured to establish a selected group of users for the identification of users.

In some implementations, the simulation server is further configured to communicate the simulating phishing email to the selected group of users.

In some implementations, types of data to collect includes one or more of the following types of data: user information, network information, system information and Light Directory Access Protocol (LDAP).

In some implementations, the campaign manager is further configured to establish for the plurality of parameters, identification of a user group to which to add those users that interact with the simulated phishing email to cause traversal via the link to the landing page.

In some implementations, the simulation server is further configured to add to the identified user group each user that interacts with the simulated phishing email to cause traversal via the link to the landing page.

In some implementations, a method for creating a plurality of different campaigns for different simulated phishing attacks includes creating, by a campaign manager executing on a processor coupled to memory, a plurality of campaigns for simulated phishing attacks. Each of the plurality of campaigns has a plurality of parameters including at least an identifier of a campaign, identification of users to which to send the campaign and a time schedule for running the campaign. Each of the plurality of campaigns has at least one parameter of the plurality of parameters different than other campaigns of the plurality of campaigns. The method further includes storing, by the campaign manager in a database, the plurality of campaigns and the associated identifier and plurality of parameters for each of the campaigns. The method further includes identifying, by a simulation server from the database, a first campaign and a second campaign from the plurality of campaigns from which to create a first simulated phishing email using a first plurality of parameters of the first campaign to send on a first time schedule to corresponding email accounts of users of the first campaign, and a second simulated phishing email using a second plurality of parameters of the second campaign to send on a second time schedule, different than the first time schedule, to corresponding email accounts of users of the second campaign.

In some implementations, creating a plurality of campaigns for simulating phishing attacks further includes setting, by the campaign manager as parameters of the plurality of parameters for each of the plurality of campaigns, a type of exploit and one or more types of data to collect via the type of exploit.

In some implementations, identifying a first campaign and a second campaign further includes identifying, by the simulation server from the database, the first campaign to create the first simulated phishing email with the type of exploit different from the type of exploit of the second simulated phishing email.

In some implementations, identifying a first campaign and a second campaign further includes identifying, by the simulation server from the database, the first campaign to create the first simulated phishing email with the one or more types of data to collect different from the one or more types of data of the second simulated phishing email.

In some implementations, creating a plurality of campaigns for simulating phishing attacks includes creating, by the campaign manager, for each of the plurality of campaigns the time schedule including one of a start time, a duration and a frequency of the campaign.

In some implementations, creating a plurality of campaigns for simulating phishing attacks further includes setting, by the campaign manager as parameters of the plurality of parameters for each of the plurality of campaign, a user group for the identification of users.

In some implementations, identifying a first campaign and a second campaign further includes identifying, by the simulation server from the database, the first campaign to create with the user group different from the user group of the second campaign.

In some implementations, a system for creating a plurality of different campaigns for different simulated phishing attacks includes a campaign manager executable on a processor coupled to memory. The campaign manager is configured to create a plurality of campaigns for simulated phishing attacks, each of the plurality of campaigns having a plurality of parameters including at least an identifier of a campaign, identification of users to which to send the campaign and a time schedule for running the campaign, each of the plurality of campaigns having at least one parameter of the plurality of parameters different than other campaigns of the plurality of campaigns. The campaign manager is further configured to store in a database the plurality of campaigns and the associated identifier and plurality of parameters for each of the campaigns. The system further includes a simulation server configured to identify from the database, a first campaign and a second campaign from the plurality of campaigns from which to create a first simulated phishing email using a first plurality of parameters of the first campaign to send on a first time schedule to corresponding email accounts of users of the first campaign, and a second simulated phishing email using a second plurality of parameters of the second campaign to send on a second time schedule, different than the first time schedule, to corresponding email accounts of users of the second campaign.

In some implementations, the campaign manager is further configured to set as parameters of the plurality of parameters for each of the plurality of campaigns a type of exploit and one or more types of data to collect via the type of exploit.

In some implementations, the simulation server is further configured to identify, from the database, the first campaign to create the first simulated phishing email with the type of exploit different from the type of exploit of the second simulated phishing email.

In some implementations, the simulation server is further configured to identify, from the database, the first campaign to create the first simulated phishing email with the one or more types of data to collect different from the one or more types of data the second simulated phishing email.

In some implementations, the campaign manager is further configured to create for each of the plurality of campaigns the time schedule including one of a start time, a duration and a frequency of the campaign.

In some implementations, the campaign manager is further configured to set as parameters of the plurality of parameters for each of the plurality of campaign, a user group for the identification of users.

In some implementations, the simulation server is further configured to identify, from the database, the first campaign to create with the user group different from the user group of the second campaign.

In some implementations, a method for running a plurality of different campaigns for different simulated phishing attacks includes establishing, by a campaign manager executing on a processor coupled to memory, a plurality of campaigns for simulated phishing attacks. Each of the plurality of campaigns has a plurality of parameters including at least an identifier of a campaign, identification of users to which to send the campaign and a time schedule for running the campaign. Each of the plurality of campaigns has at least one parameter of the plurality of parameters different than other campaigns of the plurality of campaigns. The method further includes creating, by a simulation server responsive to a first campaign of the plurality of campaigns, a first simulated phishing email using a first plurality of parameters of the first campaign. The method further includes creating, by the simulation server responsive to a second campaign of the plurality of campaigns, a second simulated phishing email using a second plurality of parameters of the second campaign. The method further includes communicating, by the simulation server, the first simulated phishing email to a first set of email accounts of a first group of users of a first campaign according to a first time schedule and the second simulated phishing email to a second set of email accounts of a second group of users of a second campaign according to a second time schedule.

In some implementations, establishing a plurality of campaigns for simulated phishing attacks further includes establishing, by the campaign manager as parameters of the plurality of parameters for each of the plurality of campaigns, a type of exploit and one or more types of data to collect via the type of exploit.

In some implementations, creating a first simulated phishing email further includes creating, by the simulation server, the first simulated phishing email to have a link to a first landing page with the type of exploit different from the type of exploit of a second landing page linked to a second simulated phishing email.

In some implementations, the method further includes creating, by the simulation server, the first landing page to collect one or more types of data different from the type of data to collect for the second landing page.

In some implementations, establishing a plurality of campaigns for simulated phishing attacks further includes establishing, by the campaign manager, for each of the plurality of campaigns the time schedule including one of a start time, a duration and a frequency of the campaign.

In some implementations, communicating the first simulated phishing email to a first set of email accounts and the second simulated phishing email to a second set of email accounts further includes communicating, by the simulation server, the first simulated phishing email in accordance with one of a start time, a duration and a frequency of the first campaign and the second simulated phishing email in accordance with one of a start time, a duration and a frequency of the second campaign.

In some implementations, communicating the first simulated phishing email to a first set of email accounts and the second simulated phishing email to a second set of email accounts further includes communicating, by the simulation server, the first simulated phishing email on the first time schedule that overlaps with a least a portion of the second time schedule over which the second simulated phishing email is communicated.

In some implementations, a system for running a plurality of different campaigns for different simulated phishing attacks includes a campaign manager executable on a processor coupled to memory, configured to establish a plurality of campaigns for a simulated phishing attack. Each of the plurality of campaigns has a plurality of parameters including at least an identifier of a campaign, identification of users to which to send the campaign and a time schedule for running the campaign. Each of the plurality of campaigns has at least one parameter of the plurality of parameters different than other campaigns of the plurality of campaigns. The system further includes a simulation server configured to create, responsive to a first campaign of the plurality of campaigns, a first simulated phishing email using a first plurality of parameters of the first campaign, and responsive to a second campaign of the plurality of campaigns, a second simulated phishing email using a second plurality of parameters of the second campaign. The simulation server is further configured to communicate the first simulated phishing email to a first set of email accounts of a first group of users of a first campaign according to a first time schedule and the second simulated phishing email to a second set of email accounts of a second group of users of a second campaign according to a second time schedule.

In some implementations, the campaign manager is further configured to establish as parameters of the plurality of parameters for each of the plurality of campaigns, a type of exploit and one or more types of data to collect via the type of exploit.

In some implementations, the simulation server is further configured to create the first simulated phishing email to have a link to a first landing page with the type of exploit different from the type of exploit of a second landing page linked to a second simulated phishing email.

In some implementations, the simulation server is further configured to create the first landing page to collect one or more types of data different from the type of data to collect for the second landing page.

In some implementations, the campaign manager is further configured to establish for each of the plurality of campaigns the time schedule including one of a start time, a duration and a frequency of the campaign.

In some implementations, the simulation server is further configured to communicate the first simulated phishing email in accordance with one of a start time, a duration and a frequency of the first campaign and the second simulated phishing email in accordance with one of a start time, a duration and a frequency of the second campaign.

In some implementations, the simulation server is further configured to communicate the first simulated phishing email on the first time schedule that overlaps with a least a portion of the second time schedule over which the second simulated phishing email is communicated.

BRIEF DESCRIPTION OF THE DRAWINGS

The foregoing and other objects, aspects, features, and advantages of the present disclosure will be best understood by referring to the following description taken in conjunction with the accompanying drawings, in which:

FIG. 4 depicts an implementation of a graphical user interface executed by a campaign management application for creating and tailoring nuanced simulated phishing attack campaigns.

FIG. 5 depicts an implementation of a graphical user interface executed by a campaign management application for creating and tailoring nuanced simulated phishing attack campaigns, with a focus on the options available related to exploit selection.

DETAILED DESCRIPTION

For purposes of reading the present disclosure, the following descriptions of the sections of the specification and their respective contents may be helpful:

Section A describes a network environment and a computing environment which may be useful for implementing embodiments described herein.

Section B describes embodiments of systems and methods of performing or creating simulated phishing attacks and phishing attack campaigns.

A. Computing and Network Environment

Figure 1A:
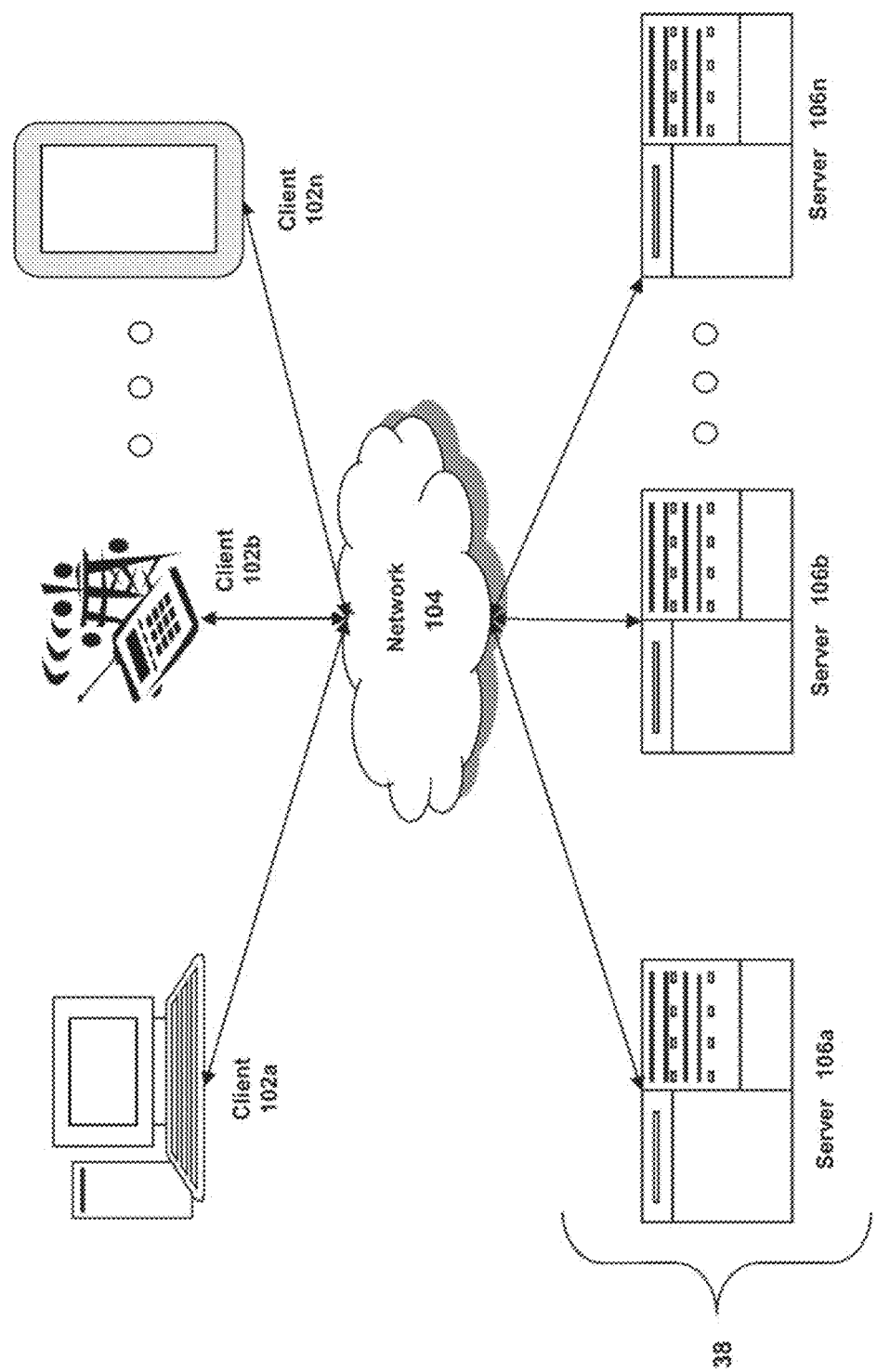
FIG. 1A is a block diagram depicting an embodiment of a network environment comprising a client device in communication with a server device.

Prior to discussing specific embodiments of the present disclosure, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

FIG. 1A shows a network 104 between (that is, networks connecting) the clients 102 and the servers 106. The clients 102 and the servers 106 may be on the same network 104, or may be on different networks. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' may be a public network. In still another of these embodiments, networks 104 and 104' may both be private networks.

The network 104 may be connected to devices and/or servers via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

Figure 1B:
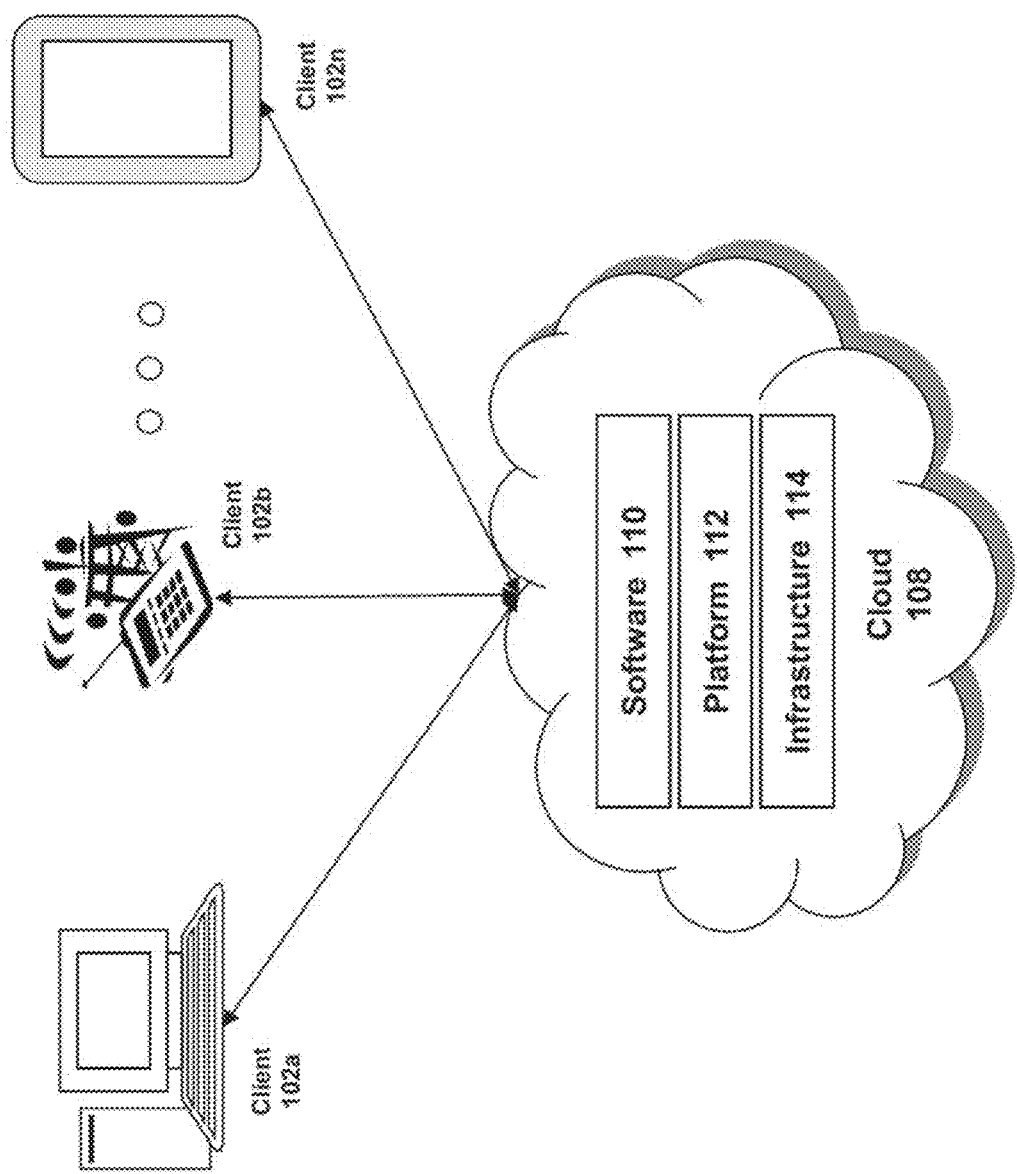
FIG. 1B is a block diagram depicting a cloud computing environment comprising a client device in communication with cloud service providers.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
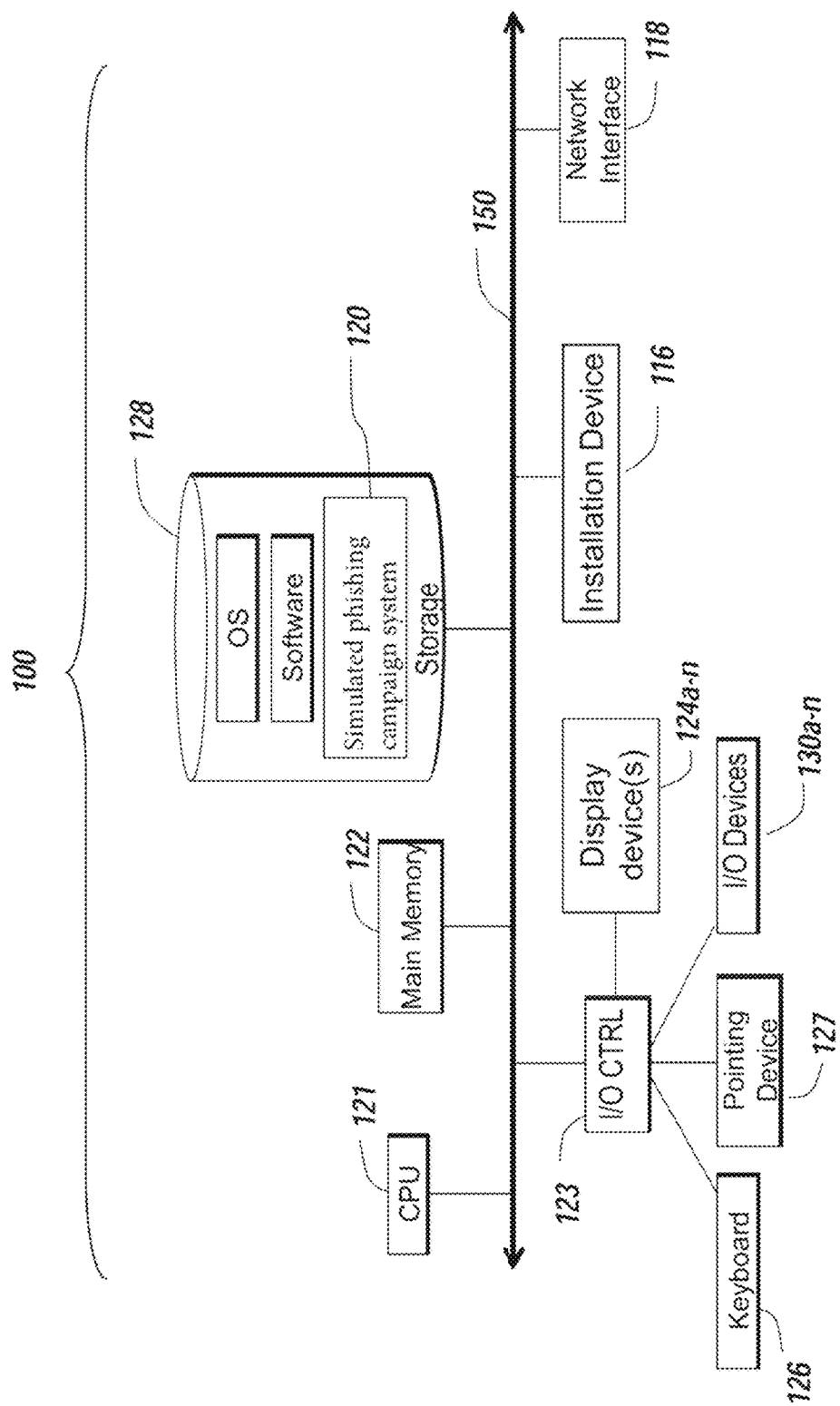
FIG. 1C and FIG. 1D are block diagrams depicting embodiments of computing devices useful in connection with the methods and systems described herein.
Figure 1D:
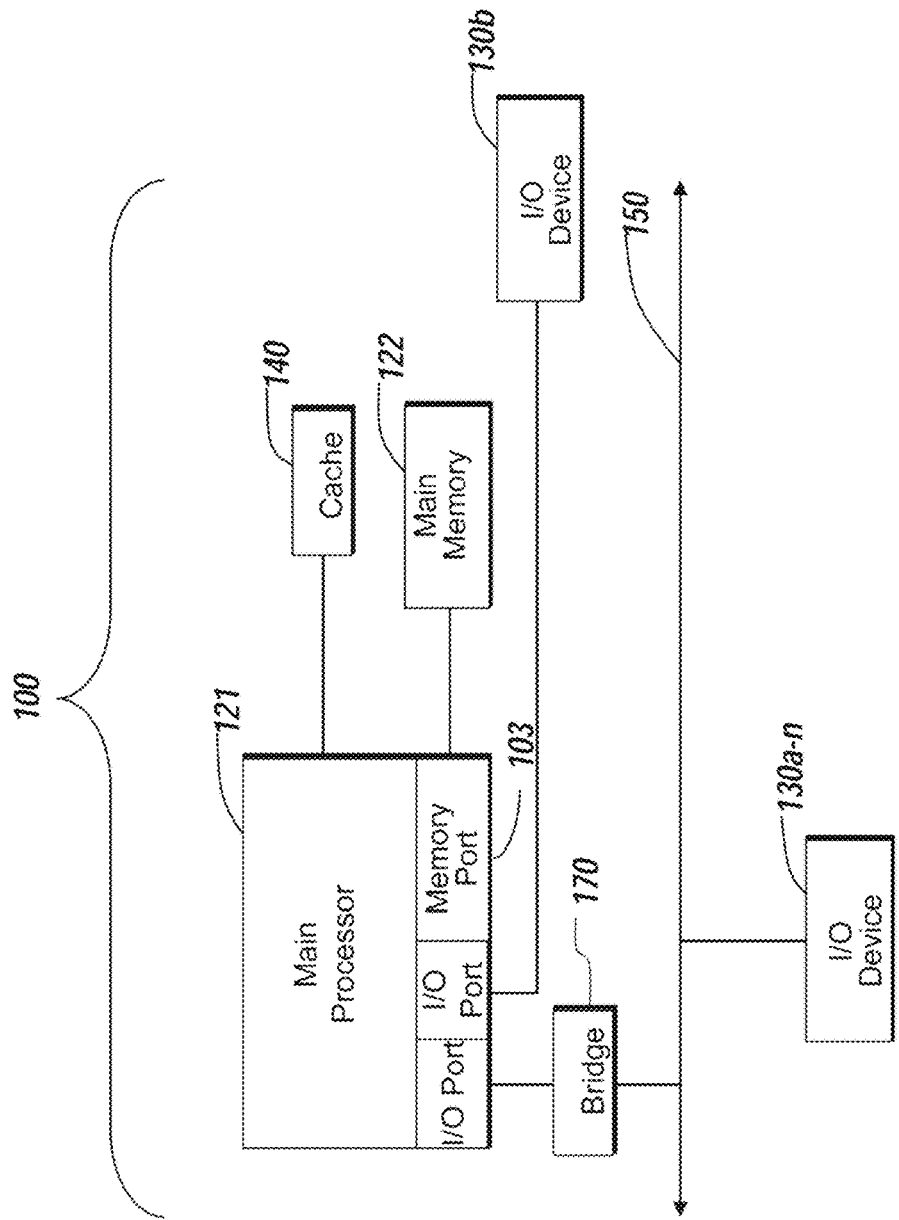

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124*a*-124*n*, a keyboard 126 and a pointing device 127, e.g. a mouse. The storage device 128 may include, without limitation, an operating system, software, and software for a simulated phishing campaign system 120. As shown in FIG. 1D, each computing device 100 may also include additional optional elements, e.g. a memory port 103, a bridge 170, one or more input/output devices 130*a*-130*n* (generally referred to using reference numeral 130), and a cache memory 140 in communication with the central processing unit 121.

The central processing unit 121 can be any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touch-screen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touch-screen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the software 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as a installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1C and 1D may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Wash.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is a eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations described in the present disclosure. Aspects of the operating environments and components described above will become apparent in the context of the systems and methods disclosed herein.

B. Systems and Methods of Performing or Creating Simulated Phishing Attacks and Phishing Attack Campaigns The following describes systems and methods of performing or creating simulated phishing attacks and phishing attack campaigns.

Systems and methods of the present disclosure are directed to performing simulated phishing attacks and phishing attack campaigns. These systems and methods allow for performing nuanced simulated phishing attacks that allow for, e.g., selection of an "exploit" and selection of the type of data to be phished. This allows simulated phishing attack campaigns to go a step further than usual and include a plurality of potential "failure" actions, which can provide a more nuanced view of just how unready or lax a target is in responding to phishing attacks.

A brief description of one implementation of a nuanced simulated phishing attack follows. In an implementation of a nuanced simulated phishing attack campaign, the simulated phishing attack may be designed to attempt to have a campaign target click a simulated malicious link in an email, as might be typical for a simulated phishing attack. If the target clicks the link, the target may land on a webpage ("landing page"), and a failure to act securely may be recorded along with associated user information (a "click link failure").

In an implementation of a nuanced simulated phishing attack campaign, a campaign manager has an option of choosing to add an "exploit" to the campaign. In such a campaign, after the campaign target clicks a link as described above and lands on a webpage, the landing page may prompt the user to execute an exploit, or to grant read and/or write permission to the exploit for files and/or code on the target's device. In such a case, the landing page may be referred to as an "exploit webpage." The exploit itself may be malware, a malicious application, or may be code to download a malicious file, or may be e.g. any other malicious executable that when executed may lead to malicious actions or behavior being performed. For example, the exploit may be data gathering software that gathers sensitive data from the target's device and may transmit it to a third party. This simulates a method used in real phishing attacks, which can use such user permission to better access sensitive information or perform other malicious actions.

If, in an implementation of a nuanced simulated phishing attack, the target allows e.g. execution of the exploit, another type of failure to act securely may be recorded along with associated user information (an "allow exploit failure"). This may allow the party running the simulated phishing attack to better understand the degree of laxness or unpreparedness of the target in dealing with phishing attacks in a secure manner. For example, a party that clicks a malicious link in an email and allows execution of an exploit at the prompt of a landing page is less prepared than a party that clicks a malicious link in an email but declines to allow execution of such an application, and can be e.g. flagged as such. This method may also better test a general security system that is in place to protect users from phishing attacks. For example, a security system may be designed to warn a user upon clicking a malicious link that the landing site does not have security certificate indicating trustworthiness. Such a security system may further be designed to warn a user that it is dangerous to execute an application when prompted to do so by such an uncertified landing site. The more nuanced simulated phishing attack described above may test the effectiveness of both of these aspects of such a security system.

Such simulated phishing attacks may be performed as part of a campaign to e.g. test the effectiveness of a security system and/or to test the readiness of a set of users to act securely in the face of a phishing attack. In such simulated phishing attack campaigns, it may be useful to allow a campaign manager control over how the campaign will be carried out. The present disclosure provides for tools for running more nuanced simulated phishing attack campaigns. This includes, but is not limited to, allowing a campaign manager to select exploit type, data to be retrieved, user groups to be targeted, frequency of the campaign (which may refer to a frequency of simulated phishing attacks or of waves of simulated phishing attacks), how to report the results of the campaign, and other parameters of the campaign. More details concerning what options are available to a campaign manager are discussed with reference to FIGS. 4 and 5.

Figure 2:
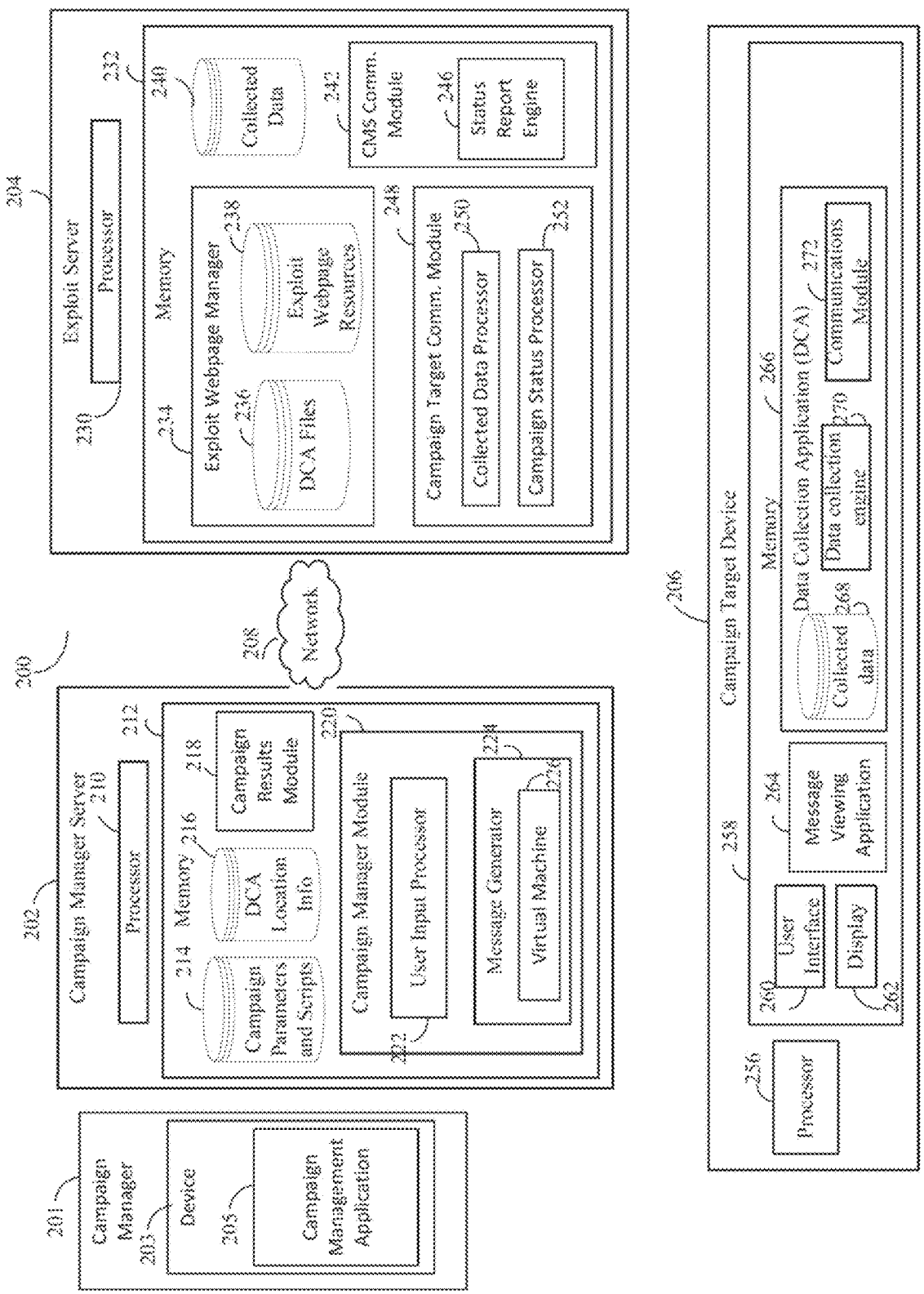
FIG. 2 depicts an implementation of some of the architecture of an implementation of a system capable of performing a nuanced simulated phishing attack campaign.

Referring to FIG. 2 in a general overview, FIG. 2 depicts some of the architecture of an implementation of a system 200 capable of performing a nuanced simulated phishing attack campaign. In an implementation, a system 200 includes a campaign manager 201, a campaign manager server 202, an exploit server 204, campaign target device 206, and a network 208 allowing communication between these system components.

In an implementation, a campaign manager 201 may be e.g., a security manager, a third party security consultant, a risk assessor, or any other party. As used herein, the "campaign manager 201" may refer to a person (e.g. a person operating, communicating with, or interacting with a device, server, or application, such as the device 203) or may refer to a device, server, or application. In some implementations, functions of the campaign manager 201 and the device 203 may be performed on the same device, server and/or application (or plurality of devices, servers, and/or applications), which may be referred to as a campaign manager 201 or a device 203. In some implementations, functions of the campaign manager 201 and functions of the campaign manager server 202 may be performed on the same device, server and/or application (or plurality of devices, servers, and/or applications), which may be referred to as a campaign manager 201. The campaign manager 201 may wish to direct a nuanced simulated phishing attack campaign by interacting with a campaign manager server 202 though a campaign management application 205 installed on a device 203. The device 203 may be, for example, a desktop computer, a laptop computer, a mobile device, or any other suitable computing device. The campaign management application 205 may be e.g. an application on a device that allows for a user of the device to interact with campaign manager server 202 for e.g. purposes of tailoring and/or executing a simulated phishing attack campaign and/or viewing and/or processing and/or analyzing the results of a phishing attack campaign. Note that as used herein, the term "application" can refer to one or more applications, services, routines, servers, daemons, or other executable logic or instructions.

In an implementation, the campaign management application 205, when executed on the device 203, causes e.g. a graphical user interface to be displayed to e.g. the campaign manager 201. The graphical user interface may be displayed on a display of the device, or on a display connected to the device (e.g. via a wired connection or wirelessly). In other implementations, the campaign management application 205 allows for user input through a non-graphical user interface, e.g. a user interface that accepts text or vocal input without displaying an interactive image. A graphical user interface may be displayed on a screen of a mobile phone, or a monitor connected to a desktop or laptop computer, or may be displayed on any other display. The user may interact with the graphical user interface on the device by, for example, typing, clicking a mouse, tapping, speaking, or any other method of interacting with a user interface. The graphical user interface on the device may be a web-based user interface provided by a web browser (e.g. GOOGLE CHROME, Microsoft INTERNET EXPLORER, or Mozilla Firefox provided by Mozilla Foundation of Mountain View, Calif.), or may be an application installed on a user device capable of opening a network connection to campaign manager server 202, or may be any other type of interface.

In an implementation, the campaign manager 201 may make choices concerning how a nuanced simulated phishing attack campaign is to be carried out. For example, a graphical user interface run by the campaign management application 205 may be displayed to the campaign manager 201 on a display of the device 203. The campaign manager 201 may input parameters for the campaign that affect how it will be carried out. For example, the campaign manager 201 may make choices as to whether to include an exploit in the campaign, what type of exploit is desired, what type of data is to be collected by the exploit (e.g. to collect at least one of: user information, network information, system information and Light Directory Access Protocol (LDAP) information), either directly or indirectly, which users to include as potential targets in the campaign, a method of determining which users are to be selected as targets of the campaign, the timing of various aspects of the campaign, which message template to use, whether to use a campaign template that includes values for one or a plurality of campaign parameters, and/or other choices. These choices may be made by e.g. selecting options displayed on a graphical user interface from dropdown menus, being presented with choices through a campaign wizard, or in any other appropriate manner. Interactions of the campaign manager 201 with a graphical user interface of a campaign management application 205 are discussed in more detail below, including in reference to FIGS. 4 and 5.

In an implementation, the campaign management application 205 may allow the campaign manager 201 to access and/or change settings of an account maintained with any party involved with the campaign, such as, for example, a third party security service provider, or a party that manages an exploit server 204, or may allow the campaign management application 205 to access and/or change settings of an account maintained with a third party security service provider, such as one that e.g. manages an exploit server, view bills and/or make payments to a third party security service provider, to perform these functions with other third parties involved in the campaign, or provide any other functions that would be appropriate for facilitating communications between the campaign manager 201 and any other parties involved in the campaign.

In an implementation, system 200 includes a campaign manager server 202. The campaign manager server 202 may be a part of a cluster of campaign manager servers. In some implementations, tasks performed by the campaign manager server 202 may be performed by a plurality of campaign manager servers. These tasks may be allocated among the cluster of servers by an application, service, daemon, routine, or other executable logic for task allocation. The campaign manager server 202 may include a processor 210 and memory 212.

In some implementations, the campaign manager server 202 may include a campaign manager module 220. The campaign manager module 220 may manage various aspects of a simulated phishing attack campaign. For example, the campaign manager module 220 may process input from the campaign manager 201, may provide access as needed to various applications, modules, and other software components of the campaign manager server 202 to other various applications, modules, and other software components of the campaign manager server 202, may monitor and control timing of various aspects of a campaign, may process requests for access to campaign results, or may perform other tasks related to the management of a campaign.

In some implementations, the campaign manager module 220 may include a user input processor 222. The user input processor 222 may manage receive input from e.g. the campaign manager 201 using e.g. the campaign management application 205 to manage a nuanced simulated phishing attack campaign. The user input processor 222 may be, for example, a library, application programming interface (API), application, set of scripts, or any other code that may be accessed by, or executed via a network connection by, or provide callback methods for, the campaign management application 205.

In an implementation, the user input processor 222 may be integrated with campaign parameters and scripts database 214. The campaign parameters and scripts database 214 may store a campaign that includes, or is defined by, a set of parameters. The campaign parameters and scripts database 214 may store parameters and scripts associated with a particular campaign. It may also store parameters and scripts associated with a plurality of campaigns. For example, the campaign parameters and scripts database 214 may store a set of parameters and scripts corresponding to the choices made by a campaign manager 201 through a campaign management application 205, e.g. as described above, for a particular campaign. The campaign parameters and scripts database 214 may store one or more messages or message templates (such as a simulated phishing e-mail template) based on which a message may be generated.

In an implementation, the campaign manager module 220 includes a message generator 224. The message generator 224 may be integrated with the campaign parameters and scripts database 214 so as to provide the message generator 224 access to parameters associated with messaging choices made for a particular campaign by e.g. the campaign manager 201. The message generator 224 may be an application, service, daemon, routine, or other executable logic for generating messages. The messages generated by the message generator 224 may be of any appropriate format. For example, they may be email messages, text messages, messages used by particular messaging applications such as, e.g., WhatsApp™, or any other type of message. A message type to be used in a particular campaign may be selected by e.g. a campaign manager 201 using a campaign management application 205. The messages may be generated in any appropriate manner, e.g. by running an instance of an application that generates the desired message type, such as running e.g. a Gmail™ application, Microsoft Outlook™, WhatsApp™, a text messaging application, or any other appropriate application. The messages may be generated using a message template stored in the campaign parameters and scripts database 214. The messages may be generated based on a message template selected or identified by the campaign manager 201, or a message template that corresponds to a parameter of a campaign. The messages may be generated by running a messaging application on e.g. a virtual machine 226 (such as a virtual machine 226 that executes a corresponding messenger application), or may simply be run on an operating system of the campaign manager server 202, or may be run in any other appropriate environment. The virtual machine 226 may be executed on the campaign manager server 202 (in which case the campaign manager server 202 may be referred to as a simulation server), or may be executed on a simulation server external to the campaign manager server 202.

In implementations, the campaign manager server 202 includes a data collection application ("DCA") location information database. In some example implementations, a DCA is an exploit selected by the campaign manager 201 to be included in the nuanced simulated phishing campaign. In some implementations, the DCA is downloaded by the DCA downloader, and the DCA downloader itself may be referred to as the exploit. A DCA may be any application that collects data from a device on which it is executed. In an implementation of a nuanced simulated phishing attack, an exploit accessible by an exploit webpage may be a DCA downloader. For example, a simulated phishing attack target may click a link that leads to an exploit webpage. The exploit webpage may prompt the target to execute an exploit, e.g. a DCA downloader. If the target executes the DCA downloader, then, e.g. upon receiving a URL that indicates where the files are to be downloaded from, the target's device may download DCA files. These files, when executed by the target's device, either constitute a DCA or allow for setup and/or installation of a DCA on the target's device.

In implementations, the campaign manager server 202 includes a campaign results module 218. The campaign results module 218 may include a database of the results of a plurality of nuanced simulated phishing attacks of one or more nuanced simulated phishing campaigns. For example, the database may include data collected from targets, records of failures such as e.g. click failures and/or exploit failures, systemic or other security measures in place during the simulated phishing attacks of a campaign, time or date logs, user identifiers, data detailing the results of analysis of campaign results including data that indicates associations between campaign results, and any other appropriate data. The campaign results module 218 may be integrated with the campaign management application 205 such that the campaign manager 201 may view, save, share, print, or perform any other appropriate action with the campaign results. The campaign results module 218 may perform analysis on the campaign results, such as upon request of the campaign manager 201. For example, this analysis may include determining which users are a security risk based on e.g. having a number of failures equal to or above a predetermined threshold (e.g. more than zero failures, more than one failure, more than five failures, or more than any other number of failures), whether certain security systems in place are effective by e.g. correlating the presence of such security systems with a lower than average incidence of failures. The campaign results module 218 may allow a campaign manager to view, on a graphical user interface run by the campaign management application 205, e.g. a timeline of overall failure rates, which may be useful in e.g. helping to determine whether a security policy that was instituted at a particular time was effective in improving security.

In an implementation, a method of performing a simulated phishing attack campaign involves an exploit server 204. The exploit server 204 may be owned and/or controlled and/or managed by a third party. For example, the exploit server 204 may be managed by an organization that performs security services such as e.g. performing or providing access to simulated phishing attacks. The exploit server 204 may be managed by the campaign manager 201. The exploit server 204 may be involved in simulated phishing attacks or in carrying out simulated phishing attack campaigns by, for example, communicating with a campaign target or with an application executed by a device used by the campaign target, serving as a communications intermediary between a campaign target or with an application executed by a device used by the campaign target and a campaign manager server, providing exploit resources, discussed below, storing and forwarding collected data, or in any other appropriate manner.

In an implementation, the exploit server 204 may be a part of a cluster of exploit servers. In some implementations, tasks performed by exploit server 204 may be performed by a plurality of exploit servers. These tasks may be allocated among the cluster of servers by an application, service, daemon, routine, or other executable logic for task allocation.

In an implementation, an exploit webpage is managed by an exploit webpage manager 234 of the exploit server 204. For example, in an implementation of a nuanced simulated phishing attack, the simulated phishing attack may be designed to attempt to have a target click a simulated malicious link in an email. If the target clicks the link, the target may land on an exploit webpage, and a failure to act securely may be recorded along with associated user information. The exploit webpage may then prompt the user to execute, or grant read/write permission to, an exploit. As discussed above, an exploit may be a malicious application, or code to download a malicious file, or any other malicious executable that when executed may lead to malicious actions being performed. The exploit webpage manager 234 be, for example, a library, application programming interface (API), application, set of scripts, or any other code that may monitor, update, report on, or serve resources for an exploit webpage, or may perform any other tasks involved in managing an exploit webpage.

In an implementation, the exploit webpage manager 234 may maintain an exploit webpage resource database 238 for use in performing e.g. the above-described tasks. For example, the exploit webpage resource database 238 may include media files, e.g. image, audio or video files to be displayed to any party accessing the exploit webpage. The exploit webpage resource database 238 may further include scripts, libraries or APIs necessary to process and respond to any party's interactions with the exploit webpage, or any other files useful for managing an exploit webpage.

In an implementation the exploit webpage manager 234 may maintain a DCA files database 236. As discussed above, a DCA may be any application that collects data from a device on which it is executed. In an implementation of a simulated phishing attack, an exploit accessible by an exploit webpage may be a DCA downloader. For example, a simulated phishing attack target may click a link that leads to an exploit webpage. The exploit webpage may prompt the target to execute an exploit, e.g. a DCA downloader. If the target executes the DCA downloader, then, e.g. upon receiving a URL that indicates where the files are to be downloaded from, the target's device may download DCA files. These files, when executed by the target's device, either constitute a DCA or lead to setup and/or installation of a DCA on the target's device. The exploit webpage manager 234 may maintain a database that includes such DCA files. In an implementation, these files may be hosted on an exploit webpage directly, such that they are downloaded and executed directly as an exploit, or may be indirectly accessed, e.g. may be downloaded by a DCA downloader exploit. In other implementations, such as e.g. an implementation in which an exploit webpage is managed by a third party server rather than the exploit server 204, the DCA files may be hosted on the third party server, or on yet another server.

In some implementations, the exploit webpage manager 234 manages multiple webpages. Multiple exploit webpages may be managed that differ at least in that they prompt a party who has accessed the webpage to execute different exploits. For example, one exploit webpage may be maintained that prompts a party who has accessed the webpage to execute a Java application, one may be maintained that prompts a party who has accessed the exploit webpage to execute a Flash script, one may be maintained that prompts a party who has accessed the exploit webpage to execute a Silverlight script, or any other exploit. In some implementations the particular exploit may be dynamically integrated with a webpage by the exploit webpage manager 234 upon e.g. receiving a communication from a campaign manager server 202 requesting e.g. a URL for an exploit webpage, the request comprising information related to campaign parameters for a particular campaign. This is useful at least because it facilitates a nuanced simulated phishing campaign in which the exploit webpage prompts the target to execute e.g. a particular exploit selected by the campaign manager 201. In some implementations, the exploit is not actually executed or is not run in a manner to cause harmful or malicious actions or behaviors to any of the computer systems or data or network or any other components. The implementation of the exploit may be designed and constructed not to perform the actions or behavior that the actual exploit or malware may have if the actual exploit or malware was executed. In many aspects, the exploit is simulated such as to not cause harm or change any of the integrity of the computer network and components therefore.

In another implementation, an exploit webpage may be managed by a third party server. This may be managed independently of an exploit server 204, or the tasks involved in managing the exploit webpage may be shared between the third party server and the exploit server 204. The third party server may perform any of the exploit website management tasks described above, including communicating with a campaign manager server.

In an implementation, an exploit server 204 includes a campaign target communications module 248. The campaign target communications module 248 may be a library, application programming interface (API), application, set of scripts, or any other code that may facilitate communications between a campaign target and the exploit server 204. These communications may include, for example, receiving and processing status updates, receiving and processing collected data, discussed below. In implementations, the campaign target communications module 248 includes a collected data processor 250, and a campaign status processor 252 to help facilitate said communications. Campaign status processor 252 may process reports as to campaign status received from the campaign target device 206 through the communications module 272, or may process data collected by DCA 266 and create reports based on that data. The reports may be suitable for processing by any of, e.g., the campaign manager module 220 and the campaign results module 218 of the campaign manager server 202. In implementations wherein an exploit webpage is managed by the exploit server 204, the campaign target communications module 248 may be integrated with an exploit manager 234 such that interactions between a campaign target and an exploit website are managed by the campaign target communications module 248.

In an implementation, a campaign target communications module 248 facilitates communications between a campaign target and the exploit server 204. For example, a DCA 266 installed on a campaign target's device to collect data for a simulated phishing attack, may communicate via a network with the campaign target communications module 248 to deliver status updates on the simulated phishing attack. For example, in the implementation depicted in e.g. FIG. 3, the DCA 266 may transmit a report to the campaign target communications module 248 indicating that it has been successfully installed, and/or a report indicating that the phishing session has been completed. This may involve the DCA 266 using a network interface such as, e.g., a network library or an API integrated with the DCA 266 capable of opening a network connection with the campaign target communications module 248.

In an implementation, campaign target communications module 248 may receive collected data from the DCA 266. This may occur on an ongoing basis, e.g. every 5 minutes, every 10 minutes, every hour, every day, or an any other schedule. The time periods between transmissions of collected data need not be uniform. Transmissions may be timed to occur after time periods in which it is likely that a significant portion of data will have been collected. For example, if it is estimated, based on the type of DCA, that 90% of the data to be collected is likely to be collected in the first hour after installation of and execution of the DCA 266, and that the remaining 10% of data will likely take an additional four hours to be collected, a first transmission may be timed to occur an hour after installation and execution of the DCA 266, and a second transmission may be timed to occur after five hours.

Different DCA types may have different timeframes for data collection and transmission. For example, in an implementation, if e.g. a Java application DCA was selected for a campaign, the data collection and transmission timeframes may be different than for e.g. a Flash script DCA based on e.g. relative speeds of data collection. A nuanced simulated phishing campaign offers a campaign manager the advantage of choosing exploit types with different data collection and transmission rates that may be useful in evaluating a security system in place. For example, running two campaigns using different exploits, e.g. a fast-acting DCA and a slow-acting DCA, may allow a campaign manager to determine whether a security system in place may catch slow-acting exploits but not fast-acting exploits. Such an insight may allow a campaign manager to make appropriate adjustments to a security system.

In some implementations, data transmissions from the campaign target device 206 to the campaign target communications module 248 may be timed to occur when the campaign target is connected to WiFi and no significant spike in e.g. 3G or 4G data use will occur, so as to better hide the activity of the DCA from the campaign target. In some implementations the DCA may only transmit the collected data once all of the data to be transmitted has been collected.

In an implementation, an exploit server 204 includes a campaign manager server communications module 242. The campaign manager server communications module ("CMSCM") 242 may be a library, application programming interface (API), application, set of scripts, or any other code that may facilitate communications between a campaign manager server 202 and the exploit server 204. The CMSCM 242 may communicate, or facilitate communication with a campaign manager server 202. For example, as depicted in FIG. 2, the CMSCM 242 may update the campaign manager server 202 as to the status of a simulated phishing attack, request that the campaign manager server 202 transmit phishing scripts specifying what information is to be collected to the DCA 266 installed on a campaign target's device, forward collected phishing data received from the DCA 266 and stored in e.g. a collected data database 240, and request that campaign manager server 202 end the simulated phishing attack campaign. The CMSCM 242 may do any or all of these tasks.

Figure 3:
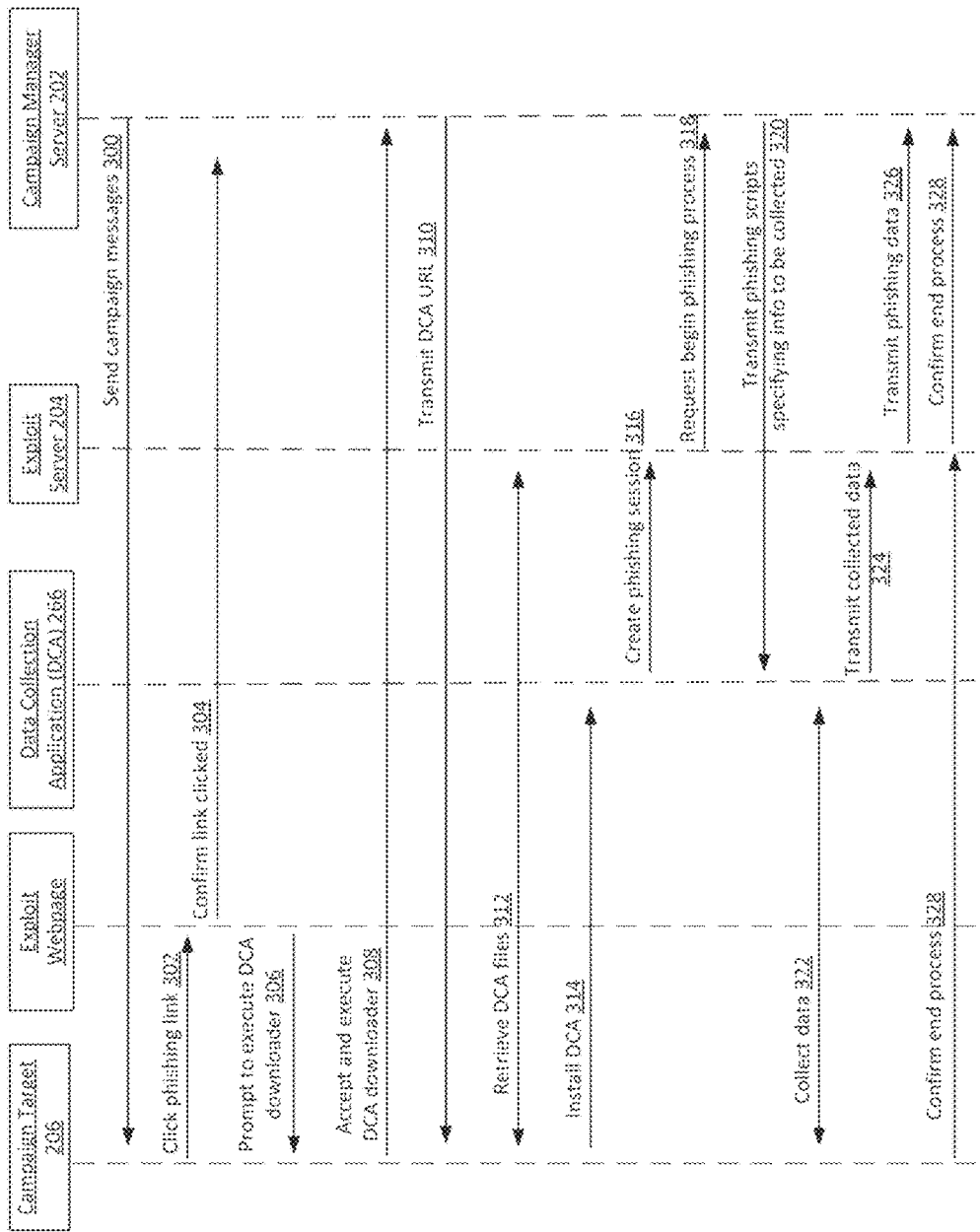
FIG. 3 depicts an implementation of a simulated phishing attack carried out during the course of a nuanced simulated phishing attack campaign.

In an implementation, the CMSCM 242 may include a status report engine 246. This may, for example, a library, application programming interface (API), application, set of scripts, or any other code that processes phishing session data received from the campaign target device 206. To at least that end, the CMSCM may be integrated with the campaign target communications module 248 such that, for example, they share access to a database of campaign status data that has been processed by e.g. the campaign status processor 252. As described above, this may involve having the collected data processor 250 process collected data and/or reports such that they are suitable for processing by the campaign manager server 202 and may further involve the status report engine verifying that the reports are suitable for processing by the campaign manager server 202, and/or contributing to the processing itself, and transmitting status reports to the campaign manager server 202. These reports may be useful in e.g. allowing the campaign manager server 202 to process campaign results, and in allowing the campaign manager server 202 to time necessary actions during the course of a nuanced simulated phishing attack such as, e.g., transmitting a DCA URL to a campaign target or transmitting phishing scripts specifying code to be collected to a campaign target, as depicted in FIG. 3.

In an implementation, a method of performing a simulated phishing attack campaign involves a campaign target device 206. A campaign target may be any target of a simulated phishing attack or simulated phishing campaign. For example, the campaign target may be an employee, member, or independent contractor working for an organization that is e.g. performing a security checkup or conducts ongoing simulated phishing attacks to maintain security. The campaign target device 206 may be any device used by the campaign target; the campaign target need not own the device for it to be considered a campaign target device 206. The campaign target device 206 may be any computing device, e.g. a desktop computer, a laptop, a mobile device, or any other computing device. In implementations, the campaign target device may be a server or set of servers accessed by the campaign target. For example, the campaign target may be the employee or a member of an organization. The campaign target may access a server that is e.g. owned or managed or otherwise associated with the organization. Such a server may be a campaign target device 206.

In an implementation, the campaign target device 206 may include a processor 256 and memory 258. The campaign target device 206 may further include a user interface 260 such as, e.g., a keyboard, a mouse, a touch screen, or any other appropriate user interface. This may be a user interface that is e.g. connected directly to a campaign target device 206, such as, for example, a keyboard connected to a mobile device, or may be connected indirectly to a campaign target device 206, such as, for example, a user interface of a client device used to access a server campaign target device 206. The campaign target device 206 may include a display 262, such as, e.g., a screen, a monitor connected to the device in any manner, or any other appropriate display.

In an implementation, the campaign target device 206 may include a message viewing application 264. The messages may be any application capable of viewing messages. For example, the message viewing application 264 may be an instance of an application that allows viewing of a desired message type, such as any web browser, a Gmail™ application, Microsoft Outlook™, WhatsApp™, a text messaging application, or any other appropriate application. In some instances, the message viewing application may allow for user interaction with e.g. hyperlinks. For example, a web browser may allow a user to click a hyperlink in a viewed message, and responsive to this click, load a webpage specified by the hyperlink code. In other implementations, hyperlink clicking may not be enabled on the message viewing application. In such implementations, a simulated phishing attack may still proceed to a target failure. For example, a target may view a message and then manually enters the hyperlink's destination URL in a web browser, leading to an exploit website. Such an action may constitute a "click link failure."

In an implementation, the campaign target device 206 may include a DCA 266. The DCA 266 may have been downloaded directly as an exploit during a simulated phishing campaign, or may have been downloaded indirectly by a DCA downloader exploit in a campaign, as described above. The DCA 266 may include a collected data database 268 to store collected data. The DCA 266 may further include a data collection engine 270, which may gather data from the campaign target device 206, and a communications module 272, which may facilitate communications with an exploit server 204 and a campaign manager 202.

In some implementations, a data collection engine 270 may be a library, application programming interface (API), application, set of scripts, or any other code that may facilitate collecting data from the device on which the data collection engine 270 is installed. The data collection engine 270 may have been preset to collect certain types of data. The data collection engine 270 may receive e.g. phishing scripts from e.g. the campaign manager server 202 specifying what information is to be collected, as depicted in FIG. 3. For example, the data collection engine 270 may be configured to search for and collect any of a set of file types found in specified or any locations on the campaign target device 206. For example, the data collection engine 270 may be configured to search for any .pdf files, .txt files, .doc files, and .docx files found on the campaign target device 206. The data collection engine 270 may search by specific lines of code or types of code found in files, file types such as image or text files, or by any other appropriate means. The data collection engine 270 may search for different files types in different locations on the campaign target device. For example, the data collection engine 270 may search all files found in an external hard drive connect to campaign target device 206 but only text files on a main hard drive of the campaign target device 206. This may prioritize files found in an external hard drive as more likely to contain sensitive information.

In an implementation, the DCA 266 may include a communications module 272. This may be a library, application programming interface (API), application, set of scripts, or any other code that may facilitate communications between the DCA and any of the campaign manager server 202, the exploit server 204, a third party server, or any other server. In some implementations, the communications module 272 determines when to transmit information from the DCA to external servers via a network. As discussed above, in some implementations, the campaign target communications module 248 may make such determinations. In some implementations, the communications module 272 may make such determinations. For example, the communications module 272 may receive instructions from the campaign target module 248 to perform a transmission, or may receive instructions to implement a predetermined transmission plan such as, for example, to transmit only when the campaign target device 206 is connected to WiFi, leaving the communications module to determine when, during WiFi connected periods of time, to transmit data. These determinations may be made in a similar manner as described above for campaign target communications module 248, or in any other appropriate manner.

The system 200 may include a network 208. The network 208 may be any type and/or form of network. The geographical scope of the network 208 may vary widely and the network 208 can be a body area network (BAN), a personal area network (PAN), a local-area network (LAN), e.g. Intranet, a metropolitan area network (MAN), a wide area network (WAN), or the Internet. The topology of the network 208 may be of any form and may include, e.g., any of the following: point-to-point, bus, star, ring, mesh, or tree. The network 208 may be an overlay network which is virtual and sits on top of one or more layers of other networks 208'. The network 208 may be of any such network topology as known to those ordinarily skilled in the art capable of supporting the operations described herein. The network 208 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 208 may be a type of a broadcast network, a telecommunications network, a data communication network, or a computer network. The network 208 may interconnect any of the devices, servers or other components of the system 200, including, for example, the campaign manager 201, the campaign manager server 202, the device 203, the exploit server 204, and the campaign target device 206.

Referring to FIG. 3 in a general overview, FIG. 3 depicts an implementation of a simulated phishing attack carried out during the course of a nuanced simulated phishing attack campaign. In the implementation depicted in FIG. 3, the exploit server 204, not a third party server, manages the exploit website. In other implementations, a third party manages the exploit website. The exploit in the depicted implementation is a DCA downloader which accesses DCA files. The DCA files provide for installation of a DCA on the campaign target device 206.

In an implementation, at step 300, a campaign manager server 202 may send campaign messages to a campaign target 206. The messages may be, for example, emails containing a hyperlink to an exploit webpage, e.g. as selected by a campaign manager 201. The emails may masquerade as coming from a trusted or innocuous seeming source. For example, the emails may come from a source that is spelled in a visually similar spelling to a trusted source, such as replacing the letter "o" in the name of a trusted source with the number "0", in order to fool the recipient in to believing the email is from the trusted source. The email may contain or display content meant to prompt or induce the campaign target 206 to click the hyperlink. For example, the email may contain content that indicates that a security update is ready for the campaign target 206 and that the campaign target should go to the linked webpage to install the update. The email may induce clicking of the link in any other appropriate manner.

In an implementation, at step 302, the campaign target 206 may click the link. In simulated phishing attacks in which the link is not clicked, a "link click success" may be recorded by the campaign manager server 202 after e.g. a predetermined amount of time has passed and the campaign manager server 202 has not received a transmission indicated that the link has been clicked. Information pertaining to this success may be processed by the campaign results module 218. In the implementation depicted in FIG. 3, however, the campaign target clicks the link and e.g. a web browser on the campaign target device 206 is directed to the exploit webpage.

In an implementation, at step 304, the exploit website may confirm to the campaign manager server 202 that a link has been clicked, allowing e.g. the campaign manager 202 to record a "click link failure". This may be performed by sending user data to the campaign manager, e.g. an I.P. address of the campaign target, or by having link be to an exploit webpage dedicated to a particular campaign target, or in any other appropriate manner. In the implementation depicted in FIG. 3, the exploit webpage is managed by the exploit server 204, and the confirmation may be transmitted to the campaign manager server 202 by the CMSCM 242 of the exploit server 204. In other implementations where the exploit webpage is managed by a third party server, the third party server may communicate directly or indirectly to the campaign manager server 202 that the link has been clicked.

Figure 6:
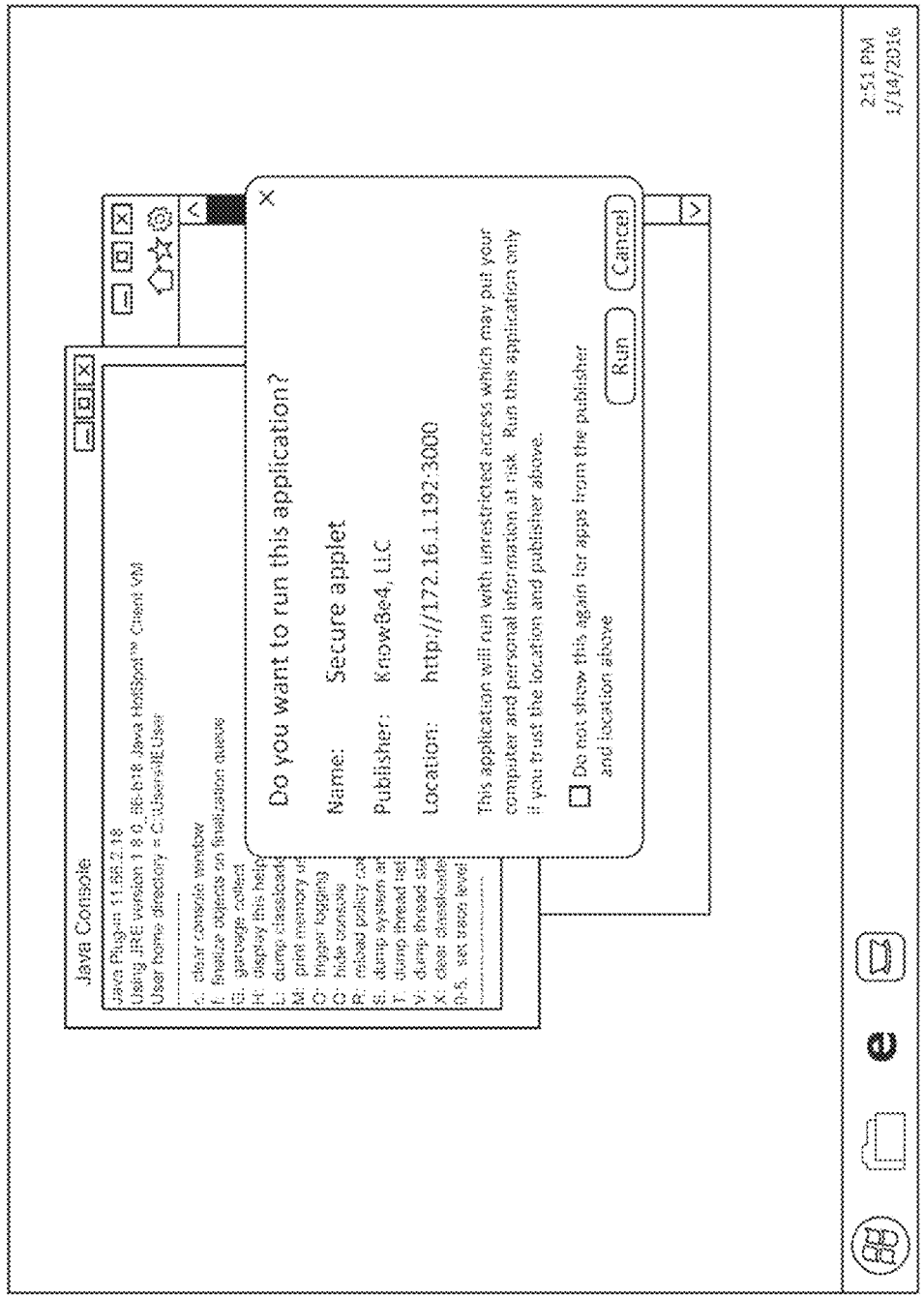
FIG. 6 depicts an implementation of a prompt of an exploit website.

In an implementation, at step 306, the exploit website may prompt the user to execute an exploit, e.g. such as a simulation of an exploit via the DCA downloader. The DCA downloader may be a Java application, a Flash script, or any other appropriate software. The exploit may have been selected by a campaign manager 201. An example of such a prompt is depicted in FIG. 6.

In an implementation, at step 308, the campaign target may respond to the prompt by executing the DCA downloader. This may cause the campaign target device and/or the exploit website to retrieve a URL indicating where DCA files may be retrieved. In other implementations, the DCA files may be directly downloaded from the exploit website. In a depicted implementation, the DCA downloader retrieves the URL form the campaign manager server 202, and confirms to the campaign manager that the exploit has been executed and that a "exploit failure" has occurred.

In an implementation, at step 310, the campaign manager server 202 may transmit the DCA URL to the campaign target, either directly or indirectly. In some implementations, the URL may be presented via a user interface. In some implementations, the URL may be sent the DCA downloader for processing.

In an implementation, at step 312, the DCA downloader executed by the campaign target 206 may retrieve DCA files found at e.g. the URL. These files may be stored on an exploit server 204, or on any other server.

In an implementation, at step 314, the DCA files may be executed by the campaign target 206 and a DCA 266 is installed. In other implementations, the DCA files themselves constitute a DCA and are executed to begin or provide or implement a data collection process.

In an implementation, at step 316, the DCA 266 may be executed by the campaign target 206 and the DCA 266 creates a phishing session. This may be performed by the communications module 272 communicate, via a network, with e.g. the campaign target communications module 248 of the exploit server 204 to report the DCA 266 has been installed and executed.

In an implementation, at step 318, the exploit server 204 may request that the campaign manager server 202 begin a phishing process. In an implementation, at step 320, the campaign manager server 202 may respond to this request by transmitting phishing scripts (e.g. to the DCA 266 directly, or to the exploit server to forward to the DCA 266). The phishing scripts may specify e.g. what information is to be collected by the DCA 266, or may have updated instructions for the DCA 266. In other implementations, the phishing scripts are stored e.g. on the exploit server 204 and step 318 is skipped, the exploit server 204 instead transmitting the phishing scripts itself to the DCA 266.

In an implementation, at step 322, the DCA 266 may gather data e.g. according to the phishing scripts, in e.g. any of the manners described above in reference to FIG. 2 or in any other appropriate manner. The data collected may be any of the data configured or specified via the campaign manager, such as any of the data collection items described in FIG. 5.

In an implementation, at step 324, the DCA 266 may transmit the collected data to e.g. the exploit server 204, in e.g. any of the manners described above in reference to FIG. 2 or in any other appropriate manner. In other implementations, the DCA 266 my transmit, directly or indirectly, the collected data to the campaign manager server 202.

In an implementation, at step 326, the exploit server 204 may transmit the collected data to campaign manager 202. The collected data may be processed in any of the manners described above in reference to FIG. 3.

In an implementation, at step 328, the DCA 266 may confirm to the exploit server 204 that the phishing process is complete. The exploit server 204 may confirm to the campaign manager 202 that the phishing process is complete.

Referring to FIG. 4 in a general overview, FIG. 4 depicts an implementation of a graphical user interface executed by a campaign management application for creating and tailoring nuanced simulated phishing attack campaigns.

In an implementation, a graphical user interface executed by a campaign management application for creating and tailoring nuanced simulated phishing attack campaigns may be presented to the campaign manager 201. The graphical user interface may allow the campaign manager 201 to select various options for the campaign. FIG. 4 depicts a set of fields to be filled and dropdown menus that allow for such selections. For example, a campaign manager 201 may name a campaign, select a start time for the campaign, and select the frequency of simulated phishing attacks or waves of simulated phishing attacks. The frequency may, for example, be set so as to strike a balance between maintaining alertness on the target of the campaign but not to be overly distracting to the targets. The campaign manager 201 may select a template for a campaign that may include a list of pre-determined parameters, the template either being provided by a third party or created by a campaign manager or other party. The campaign manager 201 may select user groups that will be targeted by the campaign. The campaign manager 201 may select a particular phish domain, or exploit webpage domain as the domain name would appear to a target who hovers a mouse pointer over an exploit webpage link. The campaign manager 201 may select a duration of the campaign, may assign "clickers" or targets who have failed to be secure in the face of simulated phishing attacks to particular groups for further reporting and analysis, or to be added to a list of users that interact with the simulated phishing email to cause traversal via the link to the landing page (e.g. a list of users who have failed to act securely). The campaign manager may select an exploit, as discussed below in reference to FIG. 5. The above is a non-exclusive list of possible selections that may be made by a campaign manager 201; the campaign manager 201 may make other selections pertaining to the campaign, and may choose not to make any of the selections discussed.

Referring to FIG. 5 in a general overview, FIG. 5 depicts an implementation of a graphical user interface executed by a campaign management application for creating and tailoring nuanced simulated phishing attack campaigns. It focuses on the options available related to selection of exploit.

FIG. 5 depicts an implementation of list of options for a campaign manager 201 to select from relating to exploit selection. In FIG. 5, a dropdown menu offering to add a Java Applet exploit if displayed. The choice to add an exploit, and what type of exploit to add, may be made in any manner. An exploit type may be chosen, for example, as described above, in an implementation, so as to allow running two campaigns using different exploits, e.g. a fast-acting DCA and a slow-acting DCA. This may allow a campaign manager to determine whether a security system in place may catch slow-acting exploits but not fast-acting exploits. Such an insight may allow a campaign manager to make appropriate adjustments to a security system.

In an implementation, a campaign manager 201 has the option of determining what data to collect from the campaign target 206. This may be based on the capabilities of a chosen exploit. For example, some exploits might perform a full search of a campaign target device 206, while other exploits might simply seek to locate saved usernames and passwords. This selection may help a campaign manager 201 carry out a nuanced simulated phishing campaign. As depicted in FIG. 5, the campaign manager 201 may determine whether to collect, for example, real-time user screen captures, network details, system details, a list of currently running applications, or any other data, e.g. consistent with the chosen exploit.

Referring to FIG. 6, FIG. 6 depicts an implementation of a prompt of an exploit website. In the depiction, a user is being prompted to execute a Java application exploit. The exploit webpage is visible underlying the prompt.

Figure 7:
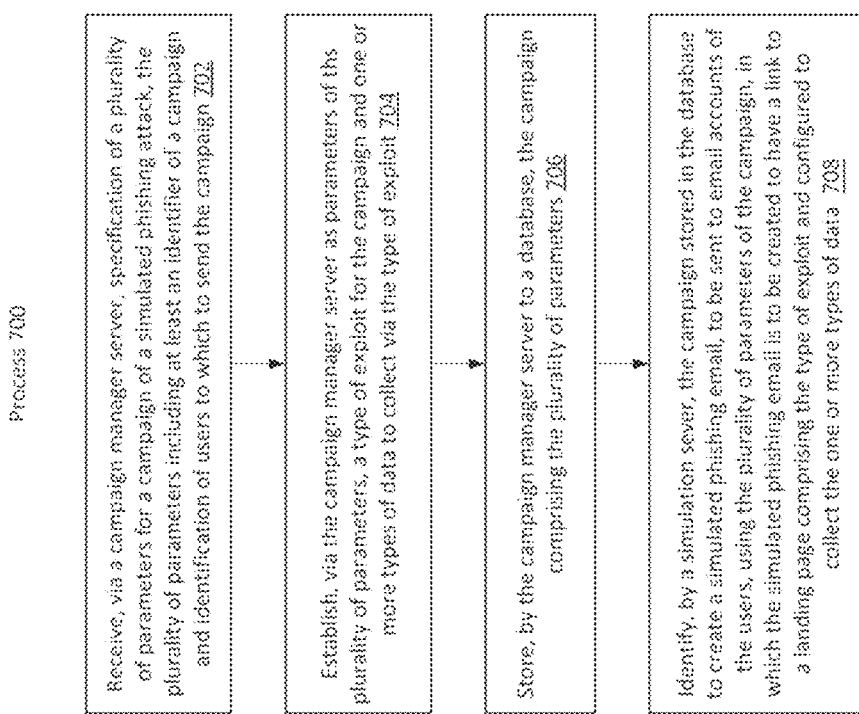
FIG. 7 depicts an implementation of a method for establishing a campaign for a simulated phishing attack based on at least a type of exploit.

Referring to FIG. 7, FIG. 7 depicts an implementation of a method (process 700) for establishing a campaign for a simulated phishing attack based on at least a type of exploit.

At step 702, a campaign manager server 202 may receive a specification of a plurality of parameters for a campaign of a simulated phishing attack, the plurality of parameters including at least an identifier of a campaign (e.g. a name or identification number) and an identification of users to which to send the campaign (e.g. a list of campaign targets). The identifier of the campaign and the identification of the users to which to send the campaign may be input to the campaign manager server 202 via a user input processor 222, and may be performed via a graphical user interface such as that depicted in FIG. 4. The parameters for the campaign may be any of the user inputs and selections of items described in FIG. 5 for configuring a campaign.

At step 704, the campaign manager server 202 may establish as parameters of the plurality of parameters, a type of exploit for the campaign (e.g. a Java applet exploit) and one or more types of data to collect (e.g. at least one of user data, network information, system information, and LDAP) via the type of exploit. The type of exploit for the campaign and one or more types of data to collect via the type of exploit may be input to the campaign manager server 202 via a user input processor 222, and may be performed via a graphical user interface such as that depicted in FIG. 5.

At step 706, the campaign manager server 202 may store to a database the campaign comprising the plurality of parameters. For example, the campaign manager server 202 may store to a campaign parameters and scripts database 214 the parameters established at step 704 as a campaign.

At step 708, a simulation sever (e.g. a message generator 224 or a server executing a virtual machine 226) may identify the campaign stored in the database at step 708 to create a simulated phishing email, to be sent to email accounts of the users, using the plurality of parameters of the campaign. The simulated phishing email is to be created to have a link to a landing page (e.g. an exploit webpage) comprising the type of exploit established at step 705 and configured to collect the one or more types of data established at step 704.

Figure 8:
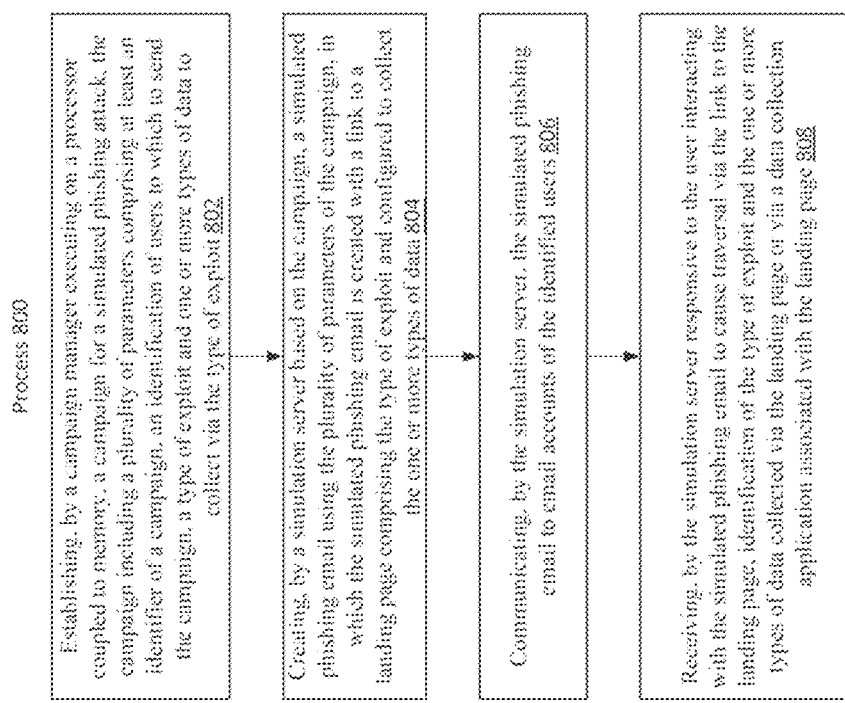
FIG. 8 depicts an implementation of a method for running a campaign for a simulated phishing attack based on at least a type of exploit.

Referring to FIG. 8, FIG. 8 depicts an implementation of a method (process 800) for running a campaign for a simulated phishing attack based on at least a type of exploit.

At step 802, a campaign manager server 202 may establish a campaign for a simulated phishing attack. The campaign may include a plurality of parameters comprising at least an identifier of a campaign (e.g. a name or identifier number for the campaign), an identification of users to which to send the campaign, a type of exploit (e.g. a Java applet exploit) and one or more types of data to collect via the type of exploit (e.g. at least one of user data, network information, system information, and LDAP).

At step 804, a simulation server (e.g. the campaign manager server 202 or a third party server) may create a simulated phishing email using the plurality of parameters of the campaign. The simulated phishing email is created with a link to a landing page (e.g. an exploit webpage) comprising the type of exploit and configured to collect the one or more types of data.

At step 806, the simulation server may communicate the simulated phishing email to email accounts of the identified users. The simulation server may send the simulation phishing email to each user simultaneously or concurrently. The simulation server may send the simulation phishing email to each user subsequently. The simulation server may send the simulation phishing email to each user according to a time schedules, such as between a start and ending time or date and/or frequency.

At step 808, the simulation server may receive, responsive to the user interacting with the simulated phishing email to cause traversal via the link to the landing page (e.g. clicking the link), identification of the type of exploit and the one or more types of data collected via the landing page or via a DCA associated with the landing page. The landing page may be designed and configured to communicate any one or more user interactions or related events to a server for data collection. The landing page may be designed and configured to communicate any one or more data items collected to a server for data collection.

Figure 9:
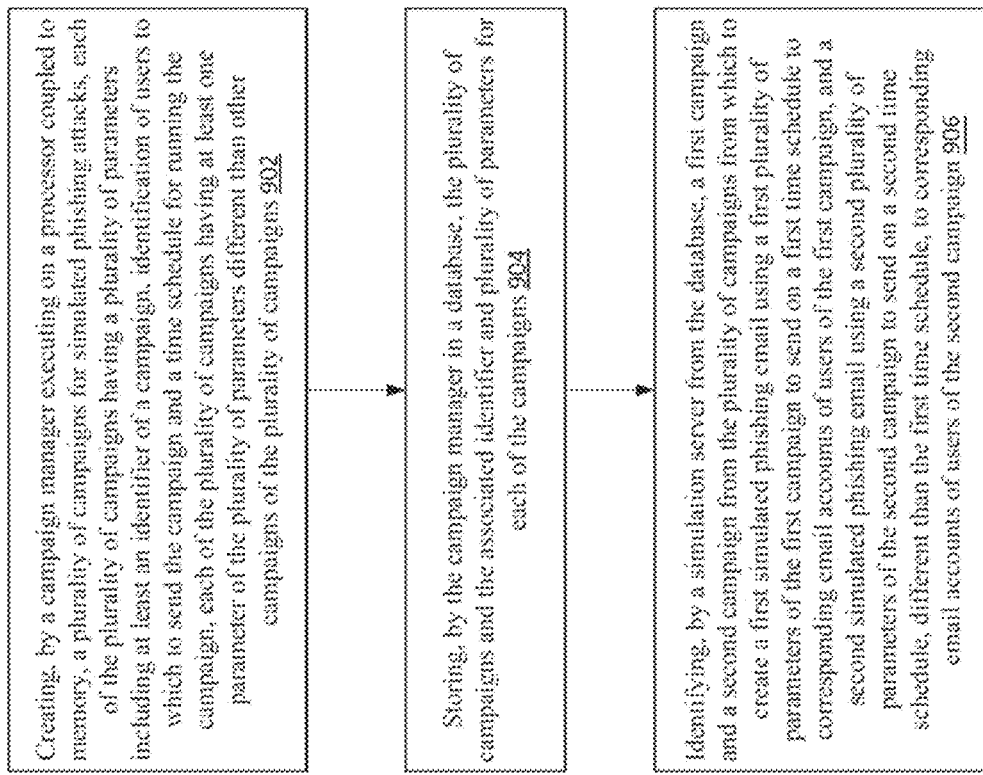
FIG. 9 depicts an implementation of a method for creating a plurality of different campaigns for different simulated phishing attacks.

Referring to FIG. 9, FIG. 9 depicts an implementation of a method (process 900) for creating a plurality of different campaigns for different simulated phishing attacks. Implementations of the present system allows users to design, configure and create different campaigns with different granularity of configuration based on different values for parameters, such as parameters comprising any of the user inputs and selections described in connection with FIGS. 4 and 5, including but not limited to user groups, phishing domains, exploits, time schedules, phishing templates, clicker groups, data collected items, etc.

At step 902, a campaign manager server 202 may create a plurality of campaigns for simulated phishing attacks, each of the plurality of campaigns having a plurality of parameters including at least an identifier of a campaign, identification of users to which to send the campaign and a time schedule for running the campaign, each of the plurality of campaigns having at least one parameter of the plurality of parameters different than other campaigns of the plurality of campaigns (such that e.g. there is at least one difference between the first campaign and the second campaign).

At step 904, the campaign manager server 202 may store in a database (e.g. a campaign parameters and scripts database 214) the plurality of campaigns and the associated identifier and plurality of parameters for each of the campaigns. The database may store a plurality of heterogeneous campaigns to be used by the simulation server to run plurality of different simulated phishing email campaigns.

At step 906, a simulation server (e.g. the campaign manager server 202 or a third party server) may identify a first campaign and a second campaign from the plurality of campaigns from which to create a first simulated phishing email using a first plurality of parameters of the first campaign to send on a first time schedule to corresponding email accounts of users of the first campaign and a second simulated phishing email using a second plurality of parameters of the second campaign to send on a second time schedule, different than the first time schedule, to corresponding email accounts of users of the second campaign. As described in FIG. 10, the simulation server may run a plurality of heterogeneous campaigns with different parameters concurrently or overlapping time schedules, or in other implementations subsequent to each other.

Figure 10:
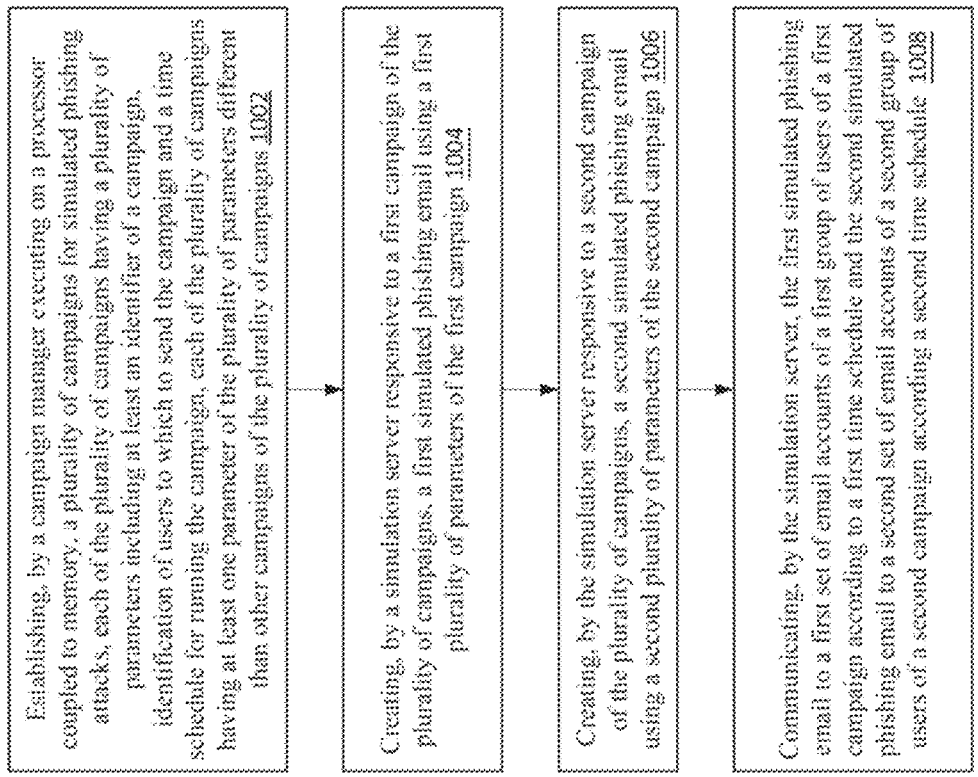
FIG. 10 depicts an implementation of a method for running a plurality of different campaigns for different simulated phishing attacks.

Referring to FIG. 10, FIG. 10 depicts an implementation of a method (process 1000) for running a plurality of different campaigns for different simulated phishing attacks.

At step 1002, a campaign manager server 202 may establish a plurality of campaigns for simulated phishing attacks, each of the plurality of campaigns having a plurality of parameters including at least an identifier of a campaign, identification of users to which to send the campaign and a time schedule for running the campaign, each of the plurality of campaigns having at least one parameter of the plurality of parameters different than other campaigns of the plurality of campaigns (such that e.g. there is at least one difference between the first campaign and the second campaign).

At step 1004, a simulation server (e.g. the campaign manager server 202 or a third party server) may create, responsive to a first campaign of the plurality of campaigns, a first simulated phishing email using a first plurality of parameters of the first campaign.

At step 1006, the simulation server may create, responsive to a second campaign of the plurality of campaigns, a second simulated phishing email using a second plurality of parameters of the second campaign. In some implementations, the second simulated phishing email may be sent to one or more users that received the first simulation phishing email (e.g., the one or more users are in both the first user group and the second user group). In some implementations, the second simulated phishing email may be sent to one or more users subsequent to the users received the first simulated phishing email. In some implementations, the second simulated phishing email may be sent to one or more users response to events of the users or response to the user's interactions with the first simulated phishing email.

At step 1008, the simulation server may communicate the first simulated phishing email to a first set of email accounts of a first group of users of a first campaign according to a first time schedule and the second simulated phishing email to a second set of email accounts of a second group of users of a second campaign according to a second time schedule. The simulation server or system may track the results from each of the campaigns.

In view of the systems and methods described herein, implementation of the present solution may be used to create and configure a wide variety of heterogeneous campaigns that different in at least one or more of any of the following parameters: user groups, email template and content, time schedule, phishing domain and, URLs, exploit type, data collected, user groups, clicked user groups, etc. With this variability and ease of granular configuration, multiple different campaigns can be easily deployed to provide simulated phishing email attacks, results and training across different types of users, computing devices and operating systems.

In view of the systems and methods described herein, implementation of the present solution may be used to create and configure a wide variety of heterogeneous campaigns to be delivered, executed or provided to the same or different users or overlapping set of users on subsequent, concurrent or overlapping time schedules. For example, having campaigns that have different schedules may allow for setting a first campaign having a high rate of simulated attacks to target a first group of users, and setting a second campaign having a lower rate of simulated attacks to target a second group of users, thus allowing heavier testing of a particular group of users (e.g. users determined to be less vigilant about security, such as a group of users identified as having failed to exercise vigilance during a previously executed simulated phishing attack) with simultaneous lighter testing of another group of users (e.g. a group determined to be less at risk). Creating different kinds of campaigns may provide for other advantages as well—for example, one campaign may include a java application exploit, and another campaign may include an exploit in which a user is prompted, by a landing page, to provide sensitive information. Such campaigns can allow for identifying particular and specific areas of vulnerability for individual users. For example, one user may be vigilant about not revealing sensitive information, but may be lax about not installing unverified applications. Another user may be vigilant about not installing unverified applications, but may be lax about not revealing sensitive information. The systems and methods described herein can be used to identify these specific characteristics of users and can be used to identify a need for specific secure-practices advisories or trainings. In another example, campaigns may be creating that include different email content and prompts, which may help to identify specific areas of vulnerability.

While the invention has been particularly shown and described with reference to specific embodiments, it should be understood by those skilled in the art that various changes in form and detail may be made therein without departing from the spirit and scope of the invention described in this disclosure.

What is claimed is:

1. A system comprising:
   a campaign manager executable on one or more processors coupled to memory, and configured to establish a campaign for a simulated phishing attack, wherein the campaign identifies a type of exploit and a selection of one or more types of data to collect via configuration of the type of exploit;
   a simulation server executable on the one or more processors, and configured to create a simulated phishing email with a link to a landing page comprising the type of exploit configured to collect the one or more types of data; and to communicate the simulated phishing email to email accounts of one or more users; and
   wherein responsive to traversal via the link to the landing page, the type of exploit and the one or more types of data collected via the landing page are identified to the simulation server.

2. The system of claim 1, wherein the campaign manager is further configured to receive the selection of the type of exploit from a plurality of types of exploits via an interface.

3. The system of claim 1, wherein the campaign manager is further configured to receive the selection of one or more types of data from a plurality of types of data for the type of exploit via an interface.

4. The system of claim 1, wherein the one or more types of data comprises one or more of the following types of data: user information, network information, system information and Light Directory Access Protocol (LDAP) information.

5. The system of claim 1, wherein the campaign manager is further configured to receive a selection of a group of users for the campaign.

6. The system of claim 5, wherein the simulation server is further configured to communicate the simulated phishing email to one or more email accounts of one or more users of the group of users.

7. The system of claim 1, wherein the simulation server is further configured to receive, responsive to traversal via the link to the landing page, identification of the type of exploit and the one or more types of data collected via the landing page.

8. The system of claim 1, wherein the simulation server is further configured to receive, responsive to traversal via the link to the landing page, data corresponding to the one or more types of data.

9. The system of claim 1, wherein the simulation server is further configured to add to a user group at least one user that interacts with the simulated phishing email to cause traversal via the link to the landing page.

10. The system of claim 1, wherein one of the landing page or the type of exploit is configured to collect the one or more types of data.

11. A system comprising:
a database configured to store a plurality of campaigns configured for one or more simulated phishing attacks, wherein each of the plurality of campaigns identifies a type of exploit and a selection of one or more types of data to collect via configuration of the type of exploit; and
a simulation server executable on one or more processors and configured to identify from the database a first campaign from the plurality of campaigns and create a first simulated phishing email with a first link to a first landing page comprising a first type of exploit and the first type of exploit configured to collect the selection of a first one or more types of data.

12. The system of claim 11, wherein the simulation server is further configured to communicate the first simulated phishing email to one or more email accounts of one or more users.

13. The system of claim 11, wherein the simulation server is further configured to identify from the database a second campaign from the plurality of campaigns.

14. The system of claim 13, wherein the simulation server is further configured to create a second simulated phishing email with a second link to a second landing page comprising a second type of exploit and the second type of exploit configured to collect the selection of a second one or more types of data.

15. The system of claim 14, wherein the simulation server is further configured to communicate the second simulated phishing email to one or more email accounts of one or more users.

16. The system of claim 12, wherein the selection of the type of exploit from a plurality of types of exploits is received via an interface.

17. The system of claim 12, the selection of one or more types of data from a plurality of types of data for the type of exploit is received via an interface.

18. The system of claim 12, wherein the one or more the types of data comprises one or more of the following types of data: user information, network information, system information and Light Directory Access Protocol (LDAP) information.

19. The system of claim 12, wherein the simulation server is further configured to receive, responsive to traversal via the first link to the first landing page, data corresponding to the one or more types of data.

20. The system of claim 12, wherein one of the landing page or the type of exploit is configured to collect the one or more types of data.

* * * * *